United States Patent
Kageme et al.

(10) Patent No.: US 11,163,051 B2
(45) Date of Patent: Nov. 2, 2021

(54) RADAR APPARATUS

(71) Applicant: MITSUBISHI ELECTRIC CORPORATION, Tokyo (JP)

(72) Inventors: Satoshi Kageme, Tokyo (JP); Teruyuki Hara, Tokyo (JP); Masanori Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 16/489,548

(22) PCT Filed: Mar. 31, 2017

(86) PCT No.: PCT/JP2017/013599
§ 371 (c)(1),
(2) Date: Aug. 28, 2019

(87) PCT Pub. No.: WO2018/179335
PCT Pub. Date: Oct. 4, 2018

(65) Prior Publication Data
US 2020/0011983 A1    Jan. 9, 2020

(51) Int. Cl.
*G01S 13/22* (2006.01)
*G01S 13/32* (2006.01)
(Continued)

(52) U.S. Cl.
CPC ............ *G01S 13/325* (2013.01); *G01S 7/282* (2013.01); *G01S 13/225* (2013.01); *G01S 13/286* (2013.01)

(58) Field of Classification Search
CPC .... G01S 13/325; G01S 13/225; G01S 13/286; G01S 13/42; G01S 7/282
See application file for complete search history.

(56) References Cited

U.S. PATENT DOCUMENTS 8,410,978 B2   4/2013   Sakai et al.
9,217,790 B2   12/2015  Kishigami et al.
(Continued)

FOREIGN PATENT DOCUMENTS

DE   10 2014 214 498 A1   1/2016
JP         5290766 B2      9/2013
(Continued)

OTHER PUBLICATIONS

German Office Action for German Application No. 112017007143.7, dated Feb. 27, 2020, with an English translation.
(Continued)

*Primary Examiner* — Timothy A Brainard
(74) *Attorney, Agent, or Firm* — Birch, Stewart, Kolasch & Birch, LLP.

(57) ABSTRACT

Transmission radars ($1\text{-}n_{TX}$) ($n_{TX}=1, 2, \ldots, N_{TX}$) generate mutually different modulation codes $Code(n_{TX}, h)$ by cyclically shifting the same code sequence by mutually different cyclic shift amounts $\Delta\tau(n_{TX})$, and generate mutually different transmission RF signals ($4\text{-}n_{TX}$) using the mutually different modulation codes $Code(n_{TX}, h)$. As a result, the number of transmission radars $1\text{-}n_{TX}$ can be made larger, and target detection accuracy can be made higher than in a case where orthogonal codes are used as mutually different modulation codes.

6 Claims, 12 Drawing Sheets

(51) Int. Cl.
*G01S 7/282* (2006.01)
*G01S 13/28* (2006.01)

(56) References Cited

U.S. PATENT DOCUMENTS

| | | | |
|---|---|---|---|
| 2009/0103593 A1* | 4/2009 | Bergamo | H04J 13/00 |
| | | | 375/146 |
| 2010/0127916 A1 | 5/2010 | Sakai et al. | |
| 2013/0135140 A1 | 5/2013 | Kishigami et al. | |
| 2017/0254879 A1* | 9/2017 | Tokieda, I | G01S 7/352 |
| 2018/0284258 A1* | 10/2018 | Roger | G01S 13/931 |

FOREIGN PATENT DOCUMENTS

| | | |
|---|---|---|
| JP | 5842143 B2 | 1/2016 |
| JP | 2016-50778 A | 4/2016 |
| WO | WO 2008/139687 A1 | 11/2008 |

OTHER PUBLICATIONS

Redinbo, "Speedier Decoding of Cyclic Codes Using Chord Properties," IEEE Transactions of Information Theory, vol. 34, No. 4, Jul. 1988, pp. 793-802 (10 pages total).
Indian Office Action for Indian Application No. 201947035779, dated Mar. 19, 2021, with an English translation.
Haderer et al., "Concatenated-Code-Based Phase-Coded CW MIMO Radar", 2016 IEEE MTT-S International Microwave Symposium, total 4 pages.
International Search Report, issued in PCT/JP2017/013599, dated Jun. 27, 2017.

* cited by examiner

| Number of Stages | Sequence Length | Number of Low Cross-Correlation Sequences | Maximum Cross-Correlation Value | |
|---|---|---|---|---|
| | | | [Ratio] | [dB] |
| 4 | 15 | 0 | – | – |
| 5 | 31 | 3 | 9/31 | -10.742 |
| 6 | 63 | 2 | 17/63 | -11.378 |
| 7 | 127 | 6 | 17/127 | -17.467 |
| 8 | 255 | 0 | – | – |

| Number of Stages | Sequence Length | Number of Low Cross-Correlation Sequences | Maximum Cross-Correlation Value | |
|---|---|---|---|---|
| | | | [Ratio] | [dB] |
| 4 | 15 | 14 | 1/15 | -23.522 |
| 5 | 31 | 30 | 1/31 | -29.827 |
| 6 | 63 | 62 | 1/63 | -35.987 |
| 7 | 127 | 126 | 1/127 | -42.076 |
| 8 | 255 | 254 | 1/255 | -48.131 |

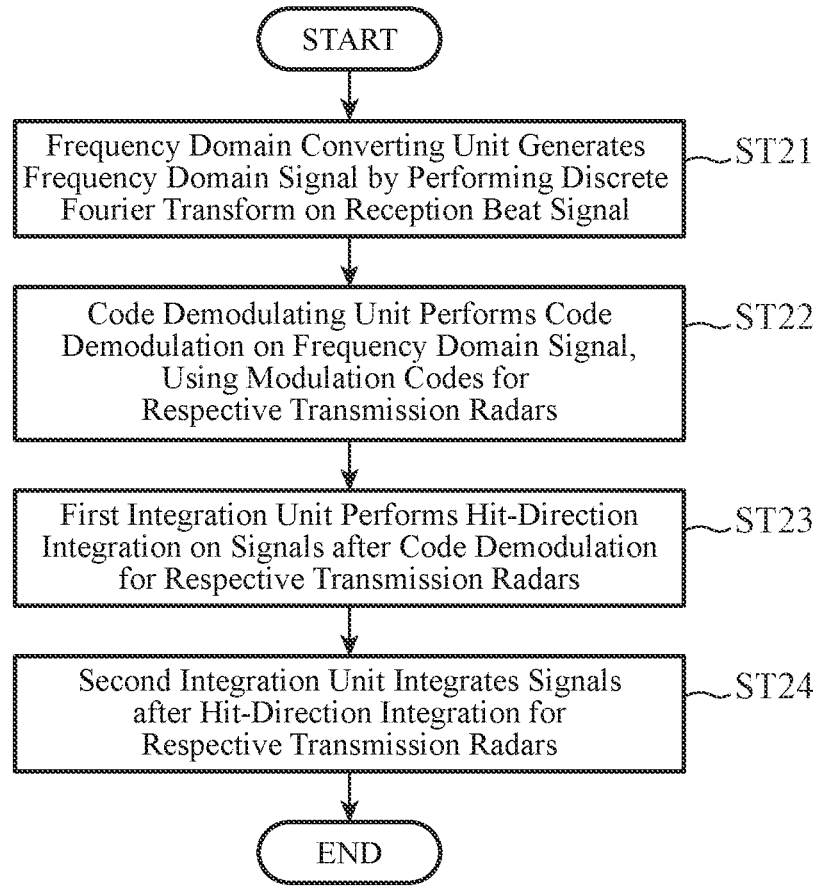

RADAR APPARATUS

TECHNICAL FIELD

The present invention relates to a radar apparatus that detects a target.

BACKGROUND ART

Non-Patent Literature 1 mentioned below discloses a radar apparatus that includes: a plurality of transmission radars that emit transmission signals; and a reception radar that receives reflected waves of the transmission signals reflected by the target to be observed after the transmission signals are emitted from the plurality of transmission radars, and outputs a reception signal of the reflected waves.

The plurality of transmission radars in this radar apparatus generate transmission signals by multiplying a local oscillation signal by modulation codes different from one another, and emit the transmission signals into a space. The plurality of transmission radars use codes orthogonal to one another as the different modulation codes. Orthogonal codes are known to be low cross-correlation code sequences.

Using the modulation codes used by the respective transmission radars in generating the transmission signals, this radar apparatus performs code demodulation on the reception signal output from the reception radar, to separate the plurality of transmission signals contained in the reception signal.

CITATION LIST

Non-Patent Literature

Non-Patent Literature 1:
Heinz Hadere, "Concatenated-code-based phase-coded CW MIMO radar," 2016 IEEE MTT-S International Microwave Symposium

SUMMARY OF INVENTION

Technical Problem

In some cases, the separated signals are integrated to increase the signal-to-noise ratio of the separated signals and enhance target detection accuracy. To prevent an increase in integration loss at the time of integration of the separated signals and a decrease in target angle measurement accuracy, code sequences having low cross-correlation need to be used as the different modulation codes when code demodulation is performed on the reception signal output from the reception radar.

For this reason, the conventional radar apparatus uses orthogonal codes as the different modulation codes when performing code demodulation on the reception signal output from the reception radar.

However, there is a limit on the number of orthogonal codes, and therefore, it is very difficult to increase the number of transmission radars to a large number, and enhance target detection accuracy, which is a problem.

The present invention has been made to solve the above problem, and aims to obtain a radar apparatus capable of making the number of transmission radars larger and target detection accuracy higher than in a case where orthogonal codes are used as modulation codes that differ from one another.

Solution to Problem

A radar apparatus according to the present invention includes: a plurality of transmission radars that generate different modulation codes by cyclically shifting the same code sequence by different cyclic shift amounts, generate different transmission signals using the different modulation codes, and emit the different transmission signals; a reception radar that receives reflected waves of the transmission signals reflected by the target to be observed after the transmission signals are emitted from the plurality of transmission radars, and outputs a reception signal of the reflected waves; a signal processor that performs code demodulation on the reception signal output from the reception radar, using the modulation codes generated by the plurality of transmission radars; and a target detecting unit that detects the target on the basis of the signal subjected to the code demodulation performed by the signal processor, wherein the signal processor includes: a frequency domain converting unit for converting the reception signal output from the reception radar into a frequency domain signal; and a code demodulating unit for performing code demodulation on the frequency domain signal converted by the frequency domain converting unit, using the modulation codes generated by the plurality of transmission radars.

Advantageous Effects of Invention

According to the present invention, different modulation codes are generated by cyclically shifting the same code sequence by different cyclic shift amounts, and different transmission signals are generated with the different modulation codes. As a result, the number of transmission radars can be made larger, and target detection accuracy can be made higher than in a case where orthogonal codes are used as the different modulation codes.

BRIEF DESCRIPTION OF DRAWINGS

FIG. 6 is a hardware configuration diagram of a computer in a case where the data processing device 8 is formed with software, firmware, or the like.

FIG. 13 is a flowchart showing the contents of a process to be performed by the signal processor 9.

FIG. 14A is an explanatory diagram showing a code demodulation process to be performed by the code demodulating unit 42 for a frequency domain signal $f_b(1, h, k)$.

FIG. 14B is an explanatory diagram showing a code demodulation process to be performed by the code demodulating unit 42 for a frequency domain signal $f_b(2, h, k)$.

FIG. 14C is an explanatory diagram showing a code demodulation process to be performed by the code demodulating unit 42 for a frequency domain signal $f_b(3, h, k)$.

DESCRIPTION OF EMBODIMENTS

To explain the present invention in greater detail, a mode for carrying out the invention are described below with reference to the accompanying drawings.

First Embodiment

Figure 1:
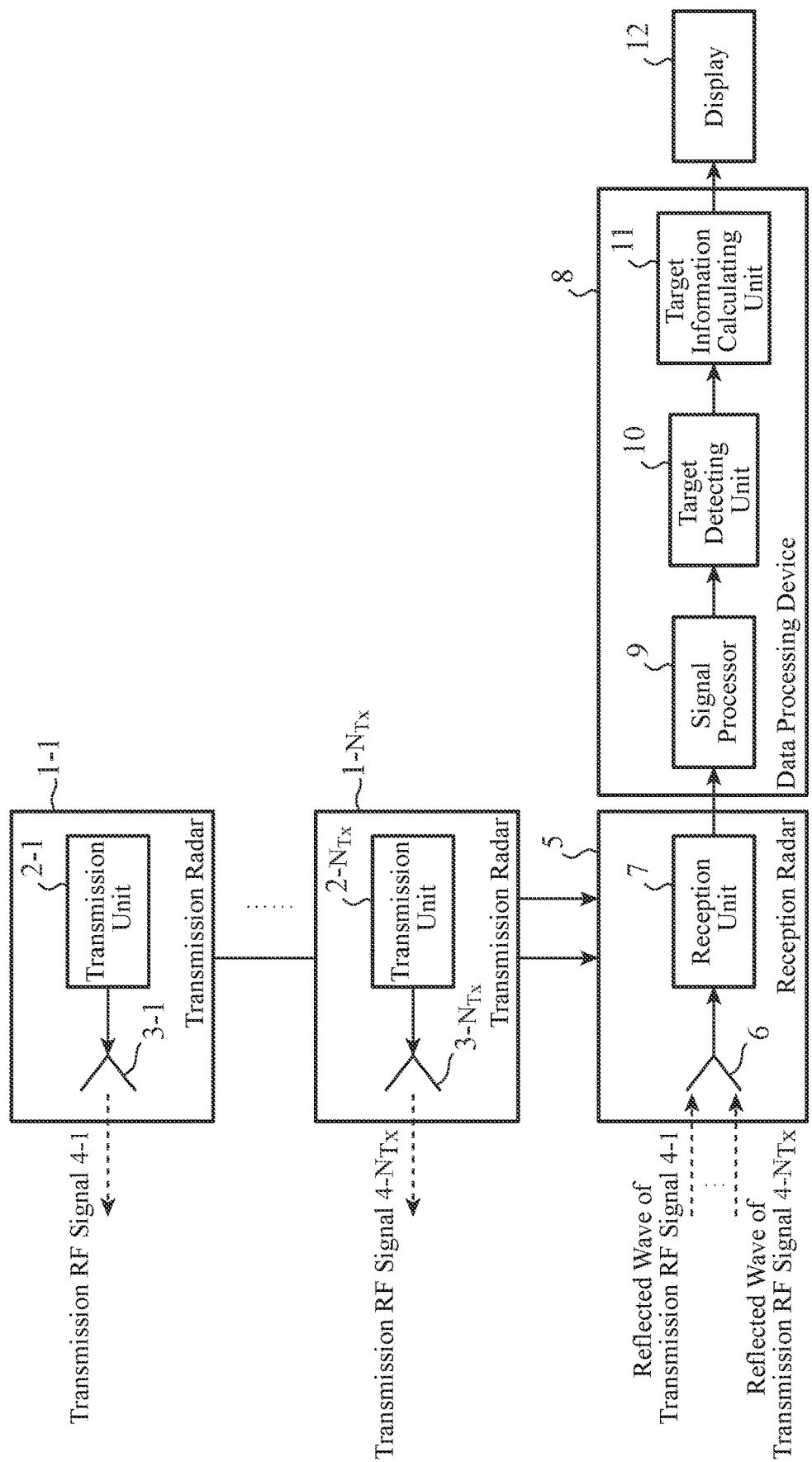
FIG. 1 is a configuration diagram showing a radar apparatus according to a first embodiment of the present invention.

FIG. 1 is a configuration diagram showing a radar apparatus according to a first embodiment of the present invention.

In FIG. 1, a transmission radar $1\text{-}n_{TX}$ ($n_{TX}=1, 2, \ldots, N_{TX}$) includes a transmission unit $2\text{-}n_{TX}$ and an antenna $3\text{-}n_{TX}$.

$N_{TX}$ transmission radars $1\text{-}n_{TX}$ generate mutually different modulation codes by cyclically shifting the same code sequence by mutually different cyclic shift amounts.

The $N_{TX}$ transmission radars $1\text{-}n_{TX}$ also generate mutually different transmission RF signals (transmission signals) 4-1 through $4\text{-}N_{TX}$ using mutually different modulation codes, and emit the mutually different transmission RF signals $4\text{-}n_{TX}$ into space.

The transmission unit $2\text{-}n_{TX}$ of each transmission radar $1\text{-}n_{TX}$ generates a modulation code by cyclically shifting a code sequence by a cyclic shift amount.

The antenna $3\text{-}n_{TX}$ of each transmission radar $1\text{-}n_{TX}$ emits the modulation code generated by the transmission unit $2\text{-}n_{TX}$ into a space.

In this example according to the first embodiment, a plurality of antennas $3\text{-}n_{TX}$ are distributedly arranged. However, a plurality of antenna elements may be distributedly arranged instead.

A reception radar 5 includes an antenna 6 and a reception unit 7.

After transmission RF signals 4-1 through $4\text{-}N_{TX}$ are emitted from the transmission radars 1-1 through $1\text{-}N_{TX}$, the reception radar 5 receives reflected waves of the transmission RF signals 4-1 through $4\text{-}N_{TX}$ reflected by the target being observed, and outputs a reception RF signal (reception signal) of the reflected waves.

The antenna 6 of the reception radar 5 receives the reflected waves of the transmission RF signals 4-1 through $4\text{-}N_{TX}$ reflected by the target.

The reception unit 7 of the reception radar 5 performs a process of receiving the reflected waves of the transmission RF signals 4-1 through $4\text{-}N_{TX}$, and outputs the reception RF signal of the reflected waves to a data processing device 8.

In this example according to the first embodiment, the number of reception radars 5 is one, for ease of explanation. However, the number of reception radars 5 may be two or larger.

The data processing device 8 includes a signal processor 9, a target detecting unit 10, and a target information calculating unit 11.

The signal processor 9 performs code demodulation on the reception RF signal output from the reception radar 5, using the modulation codes generated by the transmission radars 1-1 through $1\text{-}N_{TX}$.

The target detecting unit 10 performs a process of detecting the target, on the basis of the signals after the code demodulation performed by the signal processor 9.

The target information calculating unit 11 performs a process of calculating the velocity relative to the target detected by the target detecting unit 10, and the distance relative to the target. The velocity relative to the target means the relative velocity between the radar apparatus shown in FIG. 1 and the target, and will be hereinafter referred to as the target relative velocity. The distance relative to the target means the relative distance between the radar apparatus shown in FIG. 1 and the target, and will be hereinafter referred to as the target relative distance.

The target information calculating unit 11 also performs a process of calculating a target arrival angle that is an angle between the target detected by the target detecting unit 10 and the radar apparatus shown in FIG. 1.

A display device 12 displays, on its display screen, the target arrival angle, the target relative velocity, and the target relative distance calculated by the target information calculating unit 11.

Figure 2:
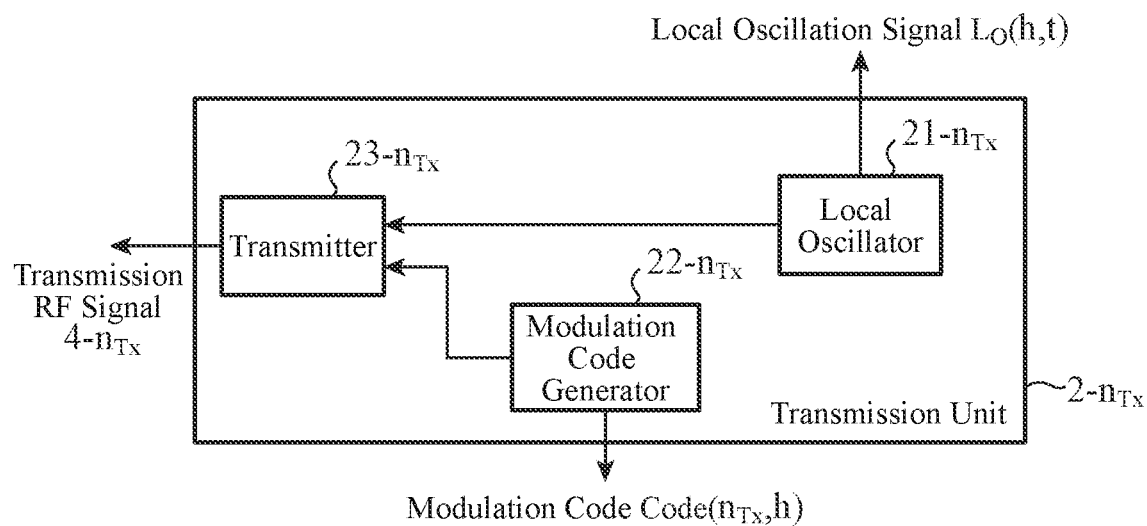
FIG. 2 is a configuration diagram showing a transmission unit $2\text{-}n_{TX}$ in a transmission radar $1\text{-}n_{TX}$ ($n_{TX}=1, 2, \ldots,$ or $N_{TX}$) of the radar apparatus according to the first embodiment of the present invention.

FIG. 2 is a configuration diagram showing the transmission unit $2\text{-}n_{TX}$ in the transmission radar $1\text{-}n_{TX}$ ($n_{TX}=1, 2, \ldots,$ or $N_{TX}$) of the radar apparatus according to the first embodiment of the present invention.

In FIG. 2, a local oscillator $21\text{-}n_{TX}$ generates a local oscillation signal $L_0(h, t)$, and outputs the local oscillation signal $L_0(h, t)$ to a transmitter $23\text{-}n_{TX}$ and the reception radar 5. Here, h represents hit number, and t represents time.

A modulation code generator $22\text{-}n_{TX}$ cyclically shifts a cyclic code $C_0(0, h)$, which is a code sequence set in advance, by a cyclic shift amount $\Delta\tau(n_{TX})$, to generate a modulation code $Code(n_{TX}, h)$ for the transmission radar $1\text{-}n_{TX}$, and outputshe modulation code $Code(n_{TX}, h)$ to the transmitter $23\text{-}n_{TX}$ and the reception radar 5.

The transmitter $23\text{-}n_{TX}$ multiplies the local oscillation signal $L_0(h, t)$ output from the local oscillator $21\text{-}n_{TX}$ by the modulation code $Code(n_{TX}, h)$ output from the modulation code generator $22\text{-}n_{TX}$, to generate a transmission RF signal $4\text{-}n_{TX}$, and outputs the transmission RF signal $4\text{-}n_{TX}$ to the antenna $3\text{-}n_{TX}$.

Figure 3:
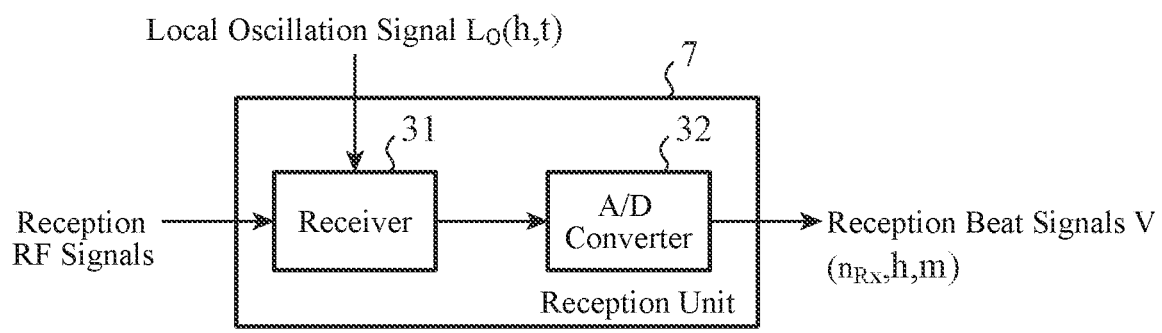
FIG. 3 is a configuration diagram showing a reception unit 7 in a reception radar 5 of the radar apparatus according to the first embodiment of the present invention.

FIG. 3 is a configuration diagram showing the reception unit 7 in the reception radar 5 of the radar apparatus according to the first embodiment of the present invention.

In FIG. 3, when the antenna 6 receives the reflected waves of the transmission RF signals 4-1 through $4\text{-}N_{TX}$ reflected by the target, a receiver 31 down-converts the frequency of the reception RF signal $Rx(n_{TX}, h, t)$ output from the antenna 6, using a local oscillation signal $L_0(h, t)$ output from the local oscillators $21\text{-}n_{TX}$ of the transmission units $2\text{-}n_{TX}$. Since the number of reception radars 5 is one in this example according to the first embodiment, $n_{RX}$ is 1.

After causing the reception RF signal $Rx(n_{RX}, h, t)$ whose frequency has been down-converted to pass through a band-pass filter, the receiver 31 performs an amplification process and a phase detection process on the reception RF signal $Rx(n_{RX}, h, t)$, to generate a reception beat signal $V'(n_{RX}, h, t)$.

An A/D converter 32, which is an analog-to-digital converter, converts the reception beat signal $V'(n_{RX}, h, t)$ generated by the receiver 31 from an analog signal to a digital signal, and outputs a reception beat signal $V(n_{RX}, h, m)$ as a digital signal to the signal processor 9. Here, m represents the sampling number in a pulse repetition interval (PRI) of the transmission RF signals $4\text{-}n_{TX}$.

Figure 4:
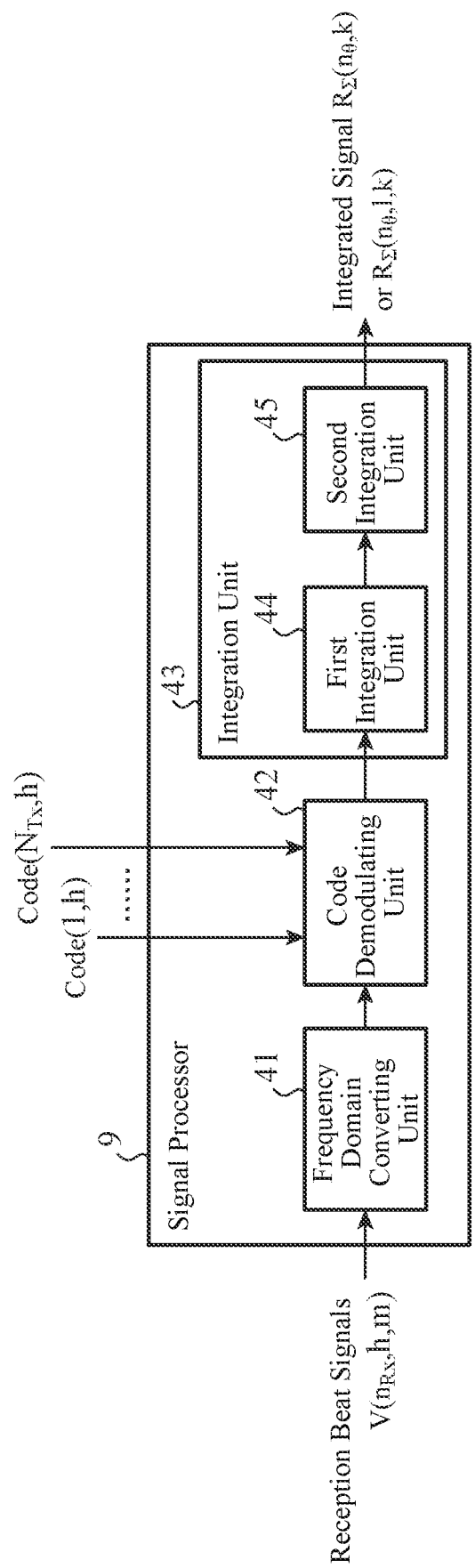
FIG. 4 is a configuration diagram showing a signal processor 9 according to the first embodiment of the present invention.

FIG. 4 is a configuration diagram showing the signal processor 9 according to the first embodiment of the present invention.

Figure 5:
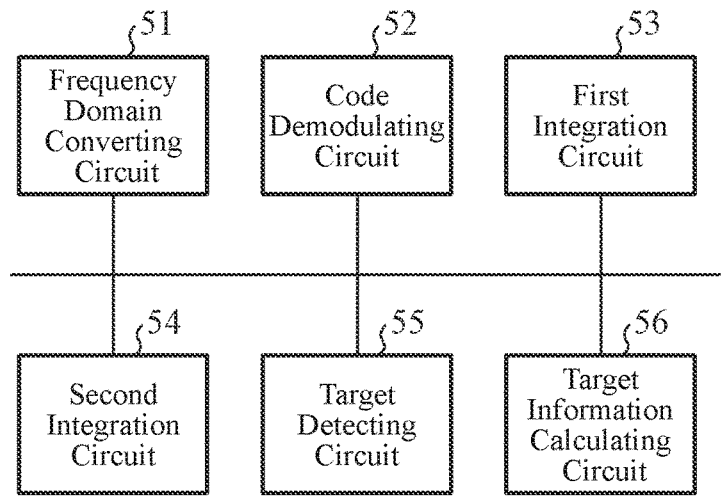
FIG. 5 is a hardware configuration diagram showing a data processing device 8 including the signal processor 9, a target detecting unit 10, and a target information calculating unit 11.

FIG. 5 is a hardware configuration diagram showing the data processing device 8 including the signal processor 9, the target detecting unit 10, and the target information calculating unit 11.

A frequency domain converting unit 41 of the signal processor 9 is formed with a frequency domain converting circuit 51 shown in FIG. 5, for example.

The frequency domain converting unit 41 performs a process of generating a frequency domain signal $f_b(n_{RX}, h, k)$ by performing Discrete Fourier Transform on the reception beat signal $V(n_{RX}, h, m)$ output from the A/D converter 32 of the reception radar 5, and outputs the frequency domain signal $f_b(n_{RX}, h, k)$ to a code demodulating unit 42. Here, $k=0, 1, \ldots, M_{fft}-1$. $M_{fft}$ represents the number of Fourier transform points.

The code demodulating unit 42 is formed with a code demodulating circuit 52 shown in FIG. 5, for example.

Using modulation codes $Code(1, h)$ through $Code(N_{TX}, h)$ generated by the transmission radars 1-1 through $1\text{-}N_{TX}$, the code demodulating unit 42 performs code demodulation on the frequency domain signal $f_b(n_{RX}, h, k)$ output from the frequency domain converting unit 41, and outputs the signals $f_{b,0,c}(n_{TX}, n_{RX}, h, k)$ subjected to the code demodulation, to an integration unit 43.

The integration unit 43 includes a first integration unit 44 and a second integration unit 45, and performs a process of integrating the signals $f_{b,0,c}(n_{TX}, n_{RX}, h, k)$ that have been subjected to the code demodulation and been output from the code demodulating unit 42.

The first integration unit 44 is formed with a first integration circuit 53 shown in FIG. 5, for example.

When the target to be observed is assumed to be a stationary target, the first integration unit 44 performs a process of hit-direction complex integration on the signals $f_{b,0,c}(n_{TX}, n_{RX}, h, k)$ that have been subjected to the code demodulation and been output from the code demodulating unit 42, to coherently integrate the signals $f_{b,0,c}(n_{TX}, n_{RX}, h, k)$, and outputs the integrated signals $f_d(n_{TX}, n_{RX}, k)$ to the second integration unit 45.

When the target to be observed is assumed to be a moving target, the first integration unit 44 performs a process of hit-direction Discrete Fourier Transform on the signals $f_{b,0,c}(n_{TX}, n_{RX}, h, k)$ that have been subjected to the code demodulation and been output from the code demodulating unit 42, to coherently integrate the signals $f_{b,0,c}(n_{TX}, n_{RX}, h, k)$, and outputs the integrated signals $f_d(n_{TX}, n_{RX}, l, k)$ to the second integration unit 45. Here, $l=0, 1, \ldots, H_{fft}-1$. $H_{fft}$ represents the number of Fourier transform points.

The second integration unit 45 is formed with a second integration circuit 54 shown in FIG. 5, for example.

The second integration unit 45 performs a process of integrating the signals $f_d(n_{TX}, n_{RX}, k)$ or $f_d(n_{TX}, n_{RX}, l, k)$ output from the first integration unit 44, on the basis of the positions of the transmission radars 1-1 through $1\text{-}N_{TX}$, the position of the reception radar 5, and a target angle number $n_\theta$ indicating the assumed target angle (the assumed value of the angle with the target), and outputs the integrated signal $R_\Sigma(n_\theta, k)$ or $R_\Sigma(n_\theta, l, k)$ to the target detecting unit 10.

Note that the target detecting unit 10 is formed with a target detecting circuit 55 shown in FIG. 5, for example, and the target information calculating unit 11 is formed with a target information calculating circuit 56 shown in FIG. 5, for example.

In the first embodiment, each of the components including the frequency domain converting unit 41, the code demodulating unit 42, the first integration unit 44, the second integration unit 45, the target detecting unit 10, and the target information calculating unit 11, which are the components of the data processing device 8, is formed with dedicated hardware as shown in FIG. 5.

That is, the data processing device 8 is formed with the frequency domain converting circuit 51, the code demodulating circuit 52, the first integration circuit 53, the second integration circuit 54, the target detecting circuit 55, and the target information calculating circuit 56.

Here, the frequency domain converting circuit 51, the code demodulating circuit 52, the first integration circuit 53, the second integration circuit 54, the target detecting circuit 55, and the target information calculating circuit 56 may be single circuits, composite circuits, programmed processors, parallel-programmed processors, application specific integrated circuits (ASICs), field-programmable gate arrays (FPGAs), or a combination thereof.

The frequency domain converting unit 41, the code demodulating unit 42, the first integration unit 44, the second integration unit 45, the target detecting unit 10, and the target information calculating unit 11, which are the components of the data processing device 8, are not necessarily formed with dedicated hardware, and may be formed with software, firmware, or a combination of software and firmware.

Software or firmware is stored as a program in a memory of a computer. A computer means hardware that executes a program, and may be a central processing unit (CPU), a central processor, a processing unit, an arithmetic unit, a microprocessor, a microcomputer, a processor, a digital signal processor (DSP), or the like, for example.

Figure 6:
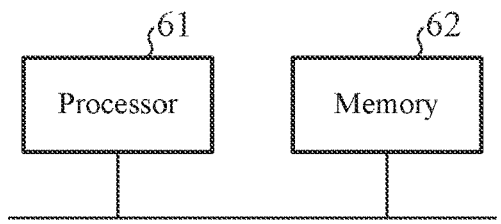

FIG. 6 is a hardware configuration diagram of a computer in a case where the data processing device 8 is formed with software, firmware, or the like.

In a case where the data processing device 8 is formed with software, firmware, or the like, a program for causing a computer to carry out processing procedures of the frequency domain converting unit 41, the code demodulating unit 42, the first integration unit 44, the second integration unit 45, the target detecting unit 10, and the target information calculating unit 11 is stored in a memory 62, and a processor 61 of the computer executes the program stored in the memory 62.

Next, the operation is described.

Figure 7:
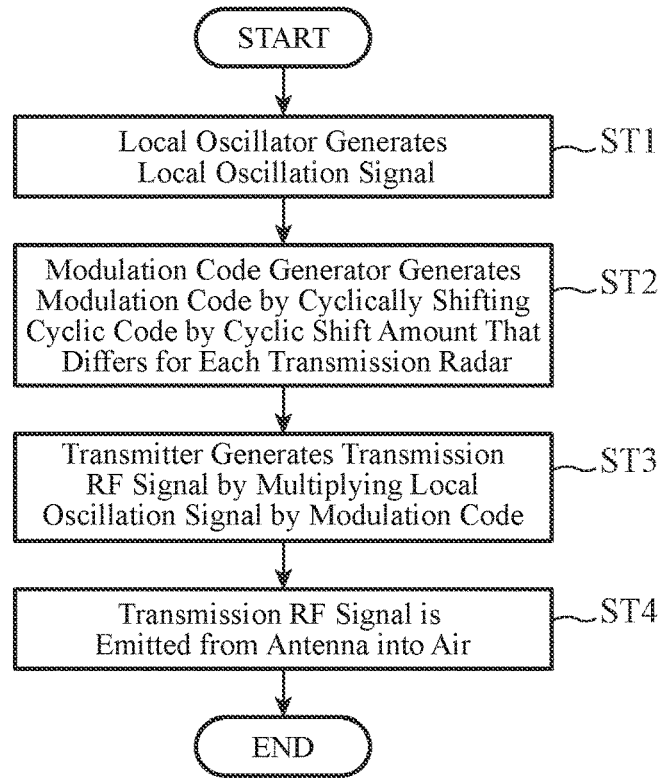
FIG. 7 is a flowchart showing operation of the transmission radar $1\text{-}n_{TX}$ ($n_{TX}=1, 2, \ldots, N_{TX}$).

First, the operation of a transmission radar $1\text{-}n_{TX}$ ($n_{TX}=1, 2, \ldots,$ or $N_{TX}$) is described, with reference to FIG. 7.

FIG. 7 is a flowchart showing the operation of a transmission radar $1\text{-}n_{TX}$.

The local oscillator $21\text{-}n_{TX}$ of the transmission radar $1\text{-}n_{TX}$ generates a local oscillation signal $L_0(h, t)$, and outputs the local oscillation signal $L_0(h, t)$ to the transmitter $23\text{-}n_{TX}$ and the reception radar 5 (step ST1 in FIG. 7).

The local oscillation signal $L_0(h, t)$ is a signal that is frequency-modulated depending on the modulation bandwidth and the modulation time, as shown in the following expression (1).

$$L_0(h, t) = \begin{cases} A_L \exp\left(j\left[2\pi\left(f_0 t - \frac{B_0}{2T_0}t^2\right) + \phi_0\right]\right), & hT_{pri} \le t < hT_{pri} + T_0 \\ 0, & \text{otherwise} \end{cases} \quad (1)$$

$(h = 0, 1, \ldots, H-1)$ $$T_{pri} = T_0 + T_1 \quad (2)$$

In expressions (1) and (2), $T_{pri}$ represents the repetition period of frequency modulation, $A_L$ represents the amplitude of the local oscillation signal $L_0(h, t)$, $\phi_0$ represents the initial phase of the local oscillation signal $L_0(h, t)$, $f_0$ represents the transmission frequency, $B_0$ represents the modulation bandwidth, $T_0$ represents the modulation time, $T_1$ represents the standby time until the next modulation, h represents the hit number, H represents the number of hits, and t represents the time.

Note that all the local oscillation signals $L_0(h, t)$ generated by the local oscillators $21\text{-}n_{TX}$ of the $N_{TX}$ transmission radars $1\text{-}n_{TX}$ are the same. For this reason, it is not necessary to output all the local oscillation signals $L_0(h, t)$ generated by the local oscillators $21\text{-}n_{TX}$ of the $N_{TX}$ transmission radars $1\text{-}n_{TX}$ to the reception radar 5, and it is enough that the local oscillation signal $L_0(h, t)$ generated by the local oscillators $21\text{-}n_{TX}$ of one of the transmission radars is output to the reception radar 5.

A cyclic code $C_0(h)$ that is a code sequence is set beforehand in the modulation code generator $22\text{-}n_{TX}$ of the transmission radar $1\text{-}n_{TX}$. For example, a maximal length sequence (M-sequence) is used as the cyclic code $C_0(h)$. The M-sequence is a sequence having the longest period (maximal length) among sequences generated by a linear recurrence formula in a Galois field.

The modulation code generator $22\text{-}n_{TX}$ generates the modulation code $Code(n_{TX}, h)$ for the transmission radar $1\text{-}n_{TX}$ by cyclically shifting the cyclic code $C_0(h)$ by the cyclic shift amount $\Delta\tau(n_{TX})$ that differs for each transmission radar $1\text{-}n_{TX}$, as shown in expression (3) below, and outputs the modulation code $Code(n_{TX}, h)$ to the transmitter $23\text{-}n_{TX}$ and the reception radar 5 (step ST2 in FIG. 7).

$Code(n_{Tx}, h) = \text{Shift}(C_0(h), \Delta\tau(n_{Tx}))$ $(h = 0, 1, \ldots, H-1)$ $(n_{Tx} = 1, \ldots, N_{Tx})$ \quad (3)

Figure 8:
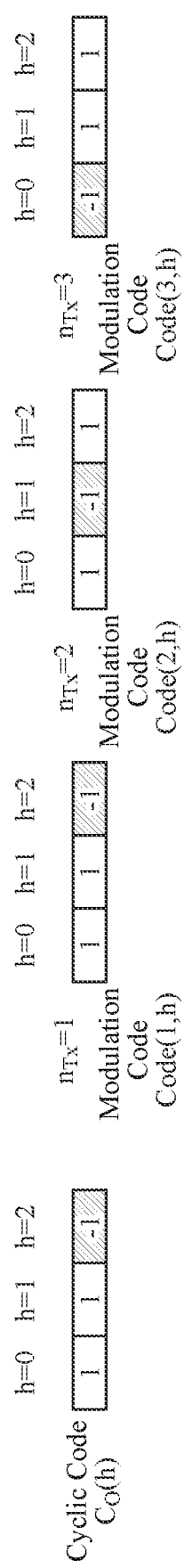
FIG. 8 is an explanatory diagram showing modulation codes Code($n_{TX}$, h) generated by a modulation code generator $22\text{-}n_{TX}$ cyclically shifting a cyclic code $C_0(h)$.

FIG. 8 is an explanatory diagram showing modulation codes $Code(n_{TX}, h)$ generated by the modulation code generator $22\text{-}n_{TX}$ cyclically shifting the cyclic code $C_0(h)$.

In the example illustrated in FIG. 8, the cyclic code $C_0(h)$ is "1 1 −1", the number of transmission radars is 3 ($N_{TX}=3$), and the number of hits is 3 (H=3).

Further, in the example illustrated in FIG. 8, the cyclic shift amount $\Delta\tau(1)$ for $n_{TX}=1$ is 0, the cyclic shift amount $\Delta\tau(2)$ for $n_{TX}=2$ is −1, and the cyclic shift amount $\Delta\tau(3)$ for $n_{TX}=3$ is −1.

Accordingly, as the modulation code $Code(1, h)$ for the transmission radar 1-1, a code "1 1 −1" is generated by cyclically shifting the code "1 1 −1", which is the cyclic code $C_0(h)$, by 0 in the hit direction.

As the modulation code $Code(2, h)$ for the transmission radar 1-2, a code "1 −1 1" is generated by cyclically shifting the code "1 1 −1", which is the cyclic code $C_0(h)$, by −1 in the hit direction.

As the modulation code $Code(3, h)$ for the transmission radar 1-3, a code "−1 1 1" is generated by cyclically shifting the code "1 1 −1", which is the cyclic code $C_0(h)$, by −2 in the hit direction.

The transmitter $23\text{-}n_{TX}$ of the transmission radar $1\text{-}n_{TX}$ generates $Tx(n_{TX}, h, t)$, which is a transmission RF signal $4\text{-}n_{TX}$, by multiplying the local oscillation signal $L_0(h, t)$ output from the local oscillator $21\text{-}n_{TX}$ by the modulation code $Code(n_{TX}, h)$ output from the modulation code generator $22\text{-}n_{TX}$, as shown in expression (4) below (step ST3 in FIG. 7).

$Tx(n_{Tx}, h, t) = L_0(h, t) Code(n_{Tx}, h)$ $(h = 0, 1, \ldots, H-1)$ $(n_{Tx} = 1, \ldots, N_{Tx})$ \quad (4)

After generating the transmission RF signal $Tx(n_{TX}, h, t)$, the transmitter $23\text{-}n_{TX}$ outputs the transmission RF signal $Tx(n_{TX}, h, t)$ to the antenna $3\text{-}n_{TX}$.

As a result, the transmission RF signal $Tx(n_{TX}, h, t)$ is emitted from the antenna $3\text{-}n_{TX}$ into the air (step ST4 in FIG. 7).

Figures 9, 10A, 10B:
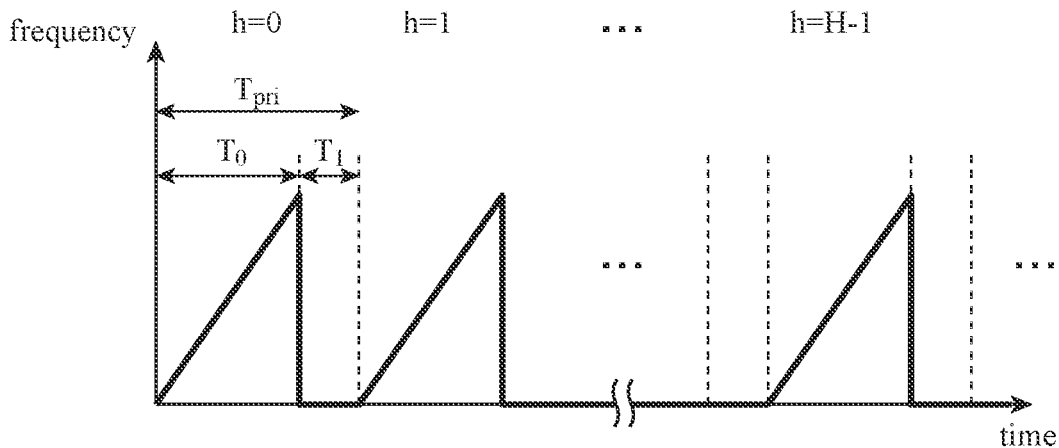
FIG. 9 is an explanatory diagram showing an example of the transmission frequency of a transmission RF signal $Tx(n_{TX}, h, t)$ emitted from the transmission radar $1\text{-}n_{TX}$.
FIG. 10A is an explanation diagram showing the number of low cross-correlation sequences, the maximum cross-correlation values, and the like in a case where orthogonal codes are used as different code sequences as in Non-Patent Literature 1.
FIG. 10B is an explanation diagram showing the number of low cross-correlation sequences, the maximum cross-correlation values, and the like in a case where a cyclic code $C_0(0, h)$ is cyclically shifted by a cyclic shift amount $\Delta\tau(n_{TX})$ that differs for each transmission radar $1\text{-}n_{TX}$ as in the first embodiment.

FIG. 9 is an explanatory diagram showing an example of the transmission frequency of the transmission RF signal $Tx(n_{TX}, h, t)$ emitted from the transmission radar $1\text{-}n_{TX}$.

FIG. 9 shows an example of a down-chirp in which the transmission frequency of the transmission RF signal $Tx(n_{TX}, h, t)$ decreases with the passage of time.

FIG. 10 are explanatory diagrams showing the number of low cross-correlation sequences, the maximum cross-correlation values, and the like in a case where modulation codes are generated with the use of code sequences.

FIG. 10A shows the number of low cross-correlation sequences, the maximum cross-correlation values, and the like in a case where orthogonal codes are used as different code sequences as in Non-Patent Literature 1.

FIG. 10B shows the number of low cross-correlation sequences, the maximum cross-correlation values, and the like in a case where a cyclic code $C_0(0, h)$ is cyclically shifted by a cyclic shift amount $\Delta\tau(n_{TX})$ that differs for each transmission radar $1\text{-}n_{TX}$ as in the first embodiment.

In the example described in the first embodiment, the $N_{TX}$ transmission radars $1\text{-}n_{TX}$ generate mutually different modulation codes by cyclically shifting an M-sequence with mutually different cyclic shift amounts, using the M-sequence as the cyclic code $C_0(h)$. However, limitation to this example is not intended.

For example, the $N_{TX}$ transmission radars $1\text{-}n_{TX}$ may use a cyclic code $C_0(h)$ whose cross-correlation value varies depending on the cyclic shift amount $\Delta\tau(n_{TX})$ as the cyclic code $C_0(h)$, set mutually different cyclic shift amounts $\Delta\tau(n_{TX})$ on the basis of the value of integral of the cross-correlation value depending on the cyclic code $C_0(h)$, and cyclically shift the cyclic code $C_0(h)$ by the set cyclic shift amounts $\Delta\tau(n_{TX})$.

For example, the cyclic code $C_0(h)$ whose cross-correlation value varies depending on the cyclic shift amount $\Delta\tau(n_{TX})$ may be a Gold sequence, a bulk sequence, or the like.

Figure 17:
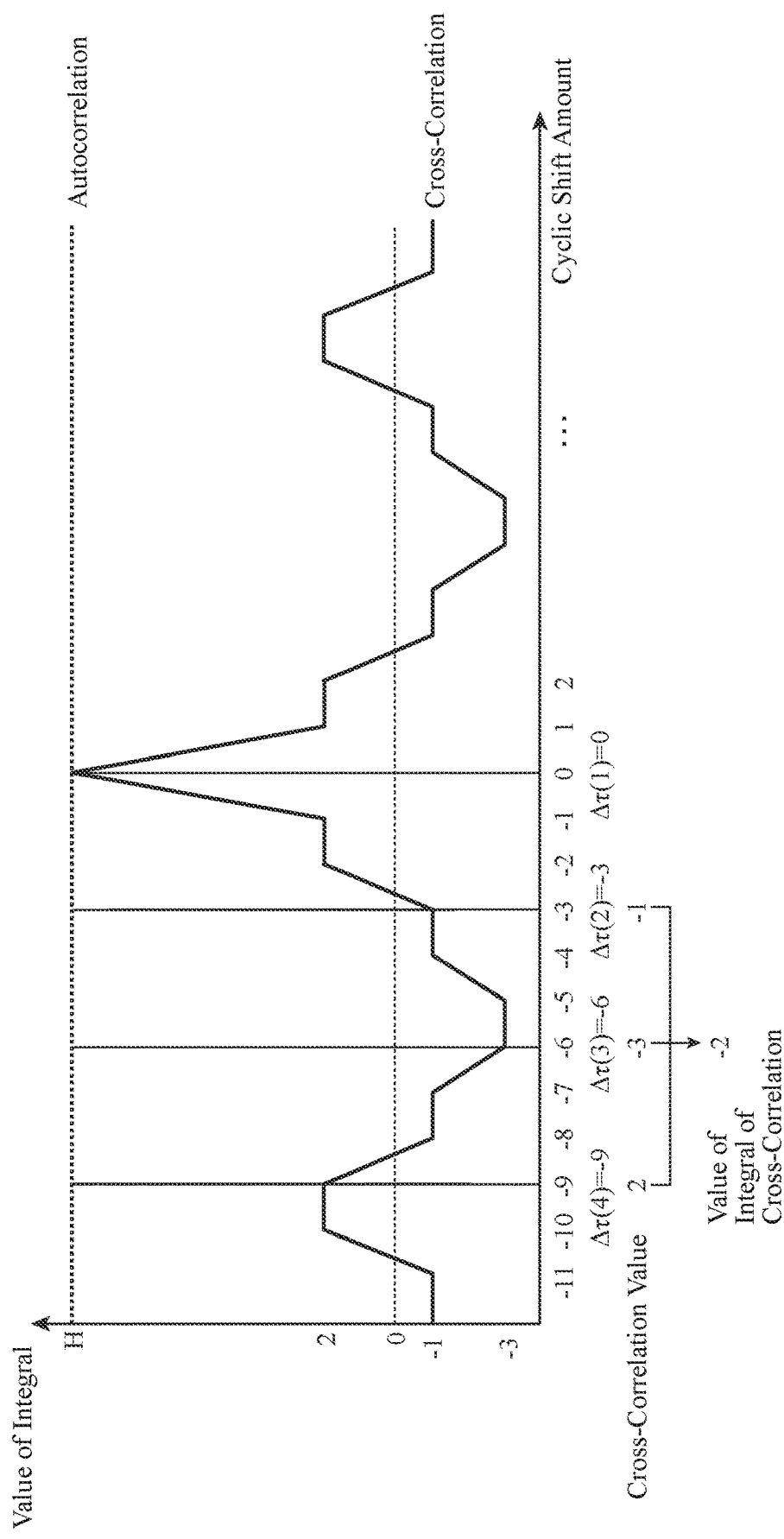
FIG. 17 is an explanatory diagram showing the relationship between the cyclic shift amount $\Delta\tau(n_{TX})$ with respect to the cyclic code $C_0(h)$ in a case where the cyclic code is a Gold sequence, and a signal $f_d(n_{TX}, n_{RX}, k)$ ($n_{TX}=1$, $n_{RX}=1$) after integration performed by the first integration unit 44.

As for the cyclic code $C_0(h)$ whose cross-correlation value varies depending on the cyclic shift amount $\Delta\tau(n_{TX})$, the cyclic shift amount $\Delta\tau(n_{TX})$ is set so that the absolute value of integral of the cross-correlation value becomes smaller, as shown in FIG. 17, for example. As a result, the cross-correlation becomes lower, and the number of transmission radars can be increased.

Specifically, in addition to the mode in which the cyclic shift amount $\Delta\tau(n_{TX})$ is set so that the absolute value of integral of the cross-correlation value becomes smaller than a preset threshold value, it is possible to adopt a mode in which the cyclic shift amount $\Delta\tau(n_{TX})$ is set so that the absolute value of integral of the cross-correlation value is minimized.

FIG. 17 is an explanatory diagram showing the relationship between the cyclic shift amount $\Delta\tau(n_{TX})$ with respect to the cyclic code $C_0(h)$ in a case where the cyclic code is a Gold sequence, and a signal $f_d(n_{TX}, n_{RX}, k)$ ($n_{TX}=1$, $n_{RX}=1$) after integration performed by the first integration unit 44.

FIG. 17 shows an example in which the value of integral of the cross-correlation value is −2 in a case where $\Delta\tau(2)=-3$ is set as the cyclic shift amount for $n_{TX}=2$, $\Delta\tau(3)=-6$ is set as the cyclic shift amount for $n_{TX}=3$, and $\Delta\tau(4)=-9$ is set as the cyclic shift amount for $n_{TX}=4$. In this example, when the absolute value of integral of the cross-correlation value is 2, and the threshold is set to 3 beforehand, for example, the absolute value of integral of the cross-correlation value is smaller than the threshold. Therefore, the above settings are adopted as the cyclic shift amounts $\Delta\tau(2)$, $\Delta\tau(3)$, and $\Delta\tau(4)$ for $n_{TX}=2$, 3, and 4.

In a case where orthogonal codes are used as different code sequences as in Non-Patent Literature 1, the number of low cross-correlation sequences is restricted by the sequence length of the code sequences.

As shown in FIG. 10A, for example, when the sequence length of the code sequence is 31, the number of low cross-correlation sequences is limited to three. When the sequence length of the code sequence is 63, the number of low cross-correlation sequences is limited to two. When the sequence length of the code sequence is 15 or 255, the number of low cross-correlation sequences is zero, and it is not possible to generate any transmission RF signal $Tx(n_{TX}, h, t)$.

In a case where the cyclic code $C_0(0, h)$ is cyclically shifted by the cyclic shift amount $\Delta\tau(n_{TX})$ that differs for each transmission radar $1\text{-}n_{TX}$ as in the first embodiment, the number of low cross-correlation sequences becomes larger than that in a case where orthogonal codes are used as in Non-Patent Literature 1.

As shown in FIG. 10B, for example, when the sequence length of the code sequence is 31, the number of low cross-correlation sequences increases to 30. When the sequence length of the code sequence is 63, the number of low cross-correlation sequences increases to 62. Further, even when the sequence length of the code sequence is 15 or 255, the number of low cross-correlation sequences is not zero. When the sequence length of the code sequence is 15, the number of low cross-correlation sequences is 14. When the sequence length of the code sequence is 255, the number of low cross-correlation sequences is 254.

Further, for any sequence length, the absolute value of the maximum cross-correlation value is greater than that in a case where orthogonal codes are used as in Non-Patent Literature 1, and the separation performance for transmission RF signals can be enhanced.

Figure 11:
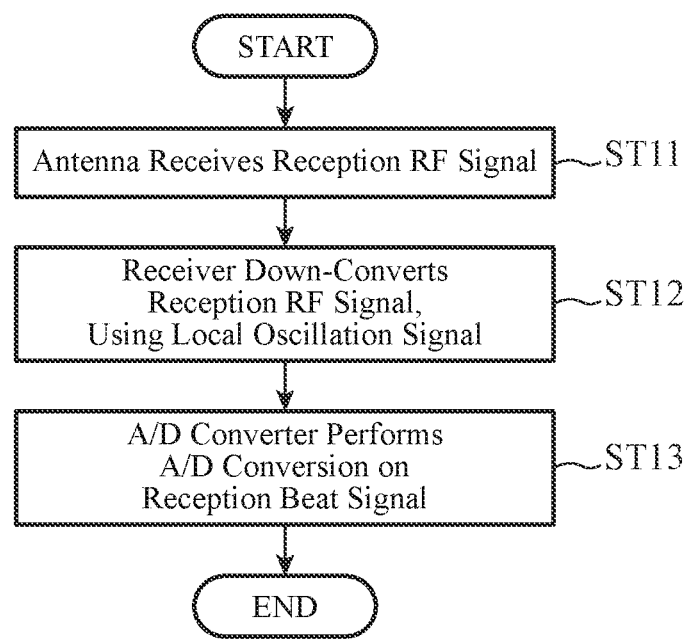
FIG. 11 is a flowchart showing operation of the reception radar 5.

Next, the operation of the reception radar 5 is described, with reference to FIG. 11.

FIG. 11 is a flowchart showing the operation of the reception radar 5.

Figure 12:
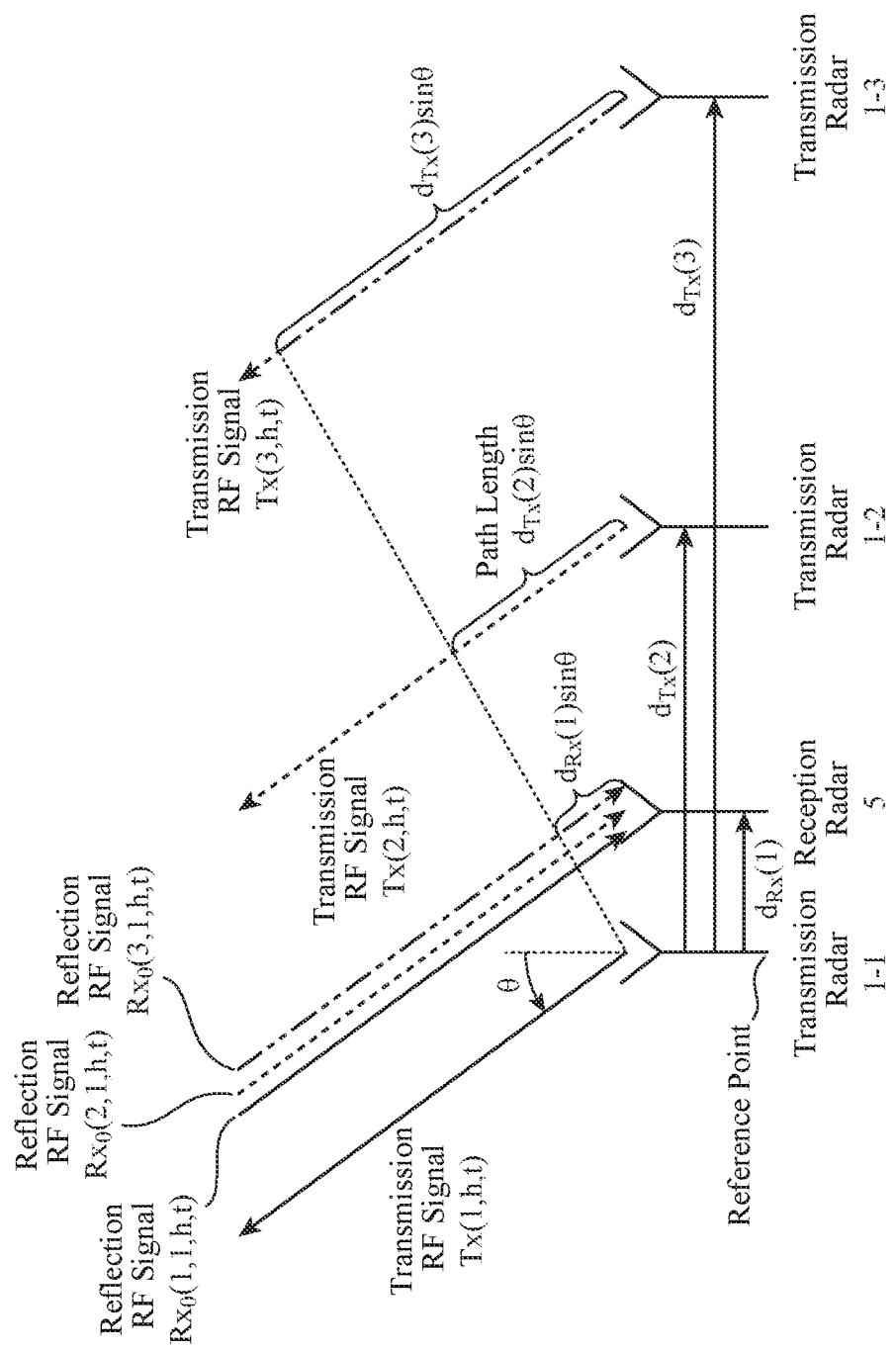
FIG. 12 is an explanatory diagram showing the positional relationship between the transmission radars $1\text{-}n_{TX}$ and the reception radar 5, and the relationship between transmission RF signals and a reception RF signal in a case where the number $N_{TX}$ of transmission radars is three, and the number $N_{RX}$ of reception radars is one.

FIG. 12 is an explanatory diagram showing the positional relationship between the transmission radars $1\text{-}n_{TX}$ and the reception radar 5, and the relationship between transmission RF signals and a reception RF signal in a case where the number $N_{TX}$ of transmission radars is three, and the number $N_{RX}$ of reception radars is one.

Transmission RF signals $Tx(n_{TX}, h, t)$ emitted into the air from the transmission radars $1\text{-}n_{TX}$ ($n_{TX}=1, 2, \ldots, N_{TX}$) are reflected by the target.

Reflection RF signals $Rx_0(n_{TX}, n_{RX}, h, t)$ that are reflected waves of the transmission RF signals $Tx(_{TX}, h, t)$ reflected by the target enter the antenna 6 of the reception radar 5.

When the reflection RF signals $Rx_0(n_{TX}, n_{RX}, h, t)$ enter the antenna 6 of the reception radar 5, the antenna 6 receives a reception RF signal $Rx(n_{RX}, h, t)$ expressed by expression (5) below, and outputs the reception RF signal $Rx(n_{RX}, h, t)$ to the receiver 31 of the reception unit 7 (step ST11 in FIG. 11).

$$Rx(n_{Rx}, h, t) = \sum_{n_{Tx}=0}^{N_{Tx}-1} Rx_0(n_{Tx}, n_{Rx}, h, t) \quad (5)$$

$$(h = 0, 1, \cdots, H-1)$$
$$(n_{Rx} = 1, \cdots, N_{Rx})$$

$$Rx_0(n_{Tx}, n_{Rx}, h, t) = \begin{cases} A_R \exp\left(j\left\{2\pi\left[f_0\left(t' - \frac{2(R_0-vt)}{c}\right) - \frac{B_0}{2T_0}\left(t' - \frac{2(R_0-vt)}{c}\right)^2\right] + \phi_0\right\}\right) \\ \quad \text{Code}(n_{Tx}, h)\exp(j\phi_{Tx}(n_{Tx}))\exp(j\phi_{Rx}(n_{Rx})), \; hT_{pri} \le t < hT_{pri} + T_0 \\ 0, \quad \text{otherwise} \end{cases}$$

$(h = 0, 1, \cdots, H - 1)$
$(n_{Tx} = 1, \cdots, N_{Tx})$  (6)
$(n_{Rx} = 1, \cdots, N_{Rx})$ In expressions (5) and (6), $A_R$ represents the amplitude of the reflection RF signal $Rx_0(n_{TX}, n_{RX}, h, t)$, $R_0$ represents the initial target relative distance, v represents the target relative velocity, θ represents the target angle, c represents the velocity of light, t' represents the time within one hit.

If the reference transmission radar among the $N_{TX}$ transmission radars $1$-$n_{TX}$ is the transmission radar 1-1, for example, $\phi_{Tx}(n_{TX})$ represents the phase difference between the transmission radar 1-1 and a transmission radar $1$-$n_{TX}$, and is expressed by expression (7) shown below.

In the example described in the first embodiment, the number of reception radars 5 is one. However, in a case where the number of reception radars 5 is one or larger, $\phi_{Rx}(n_{RX})$ represents the phase difference between the reference reception radar 5 and another reception radar 5 among the one or more reception radars 5, and is expressed by expression (8) shown below.

$$\phi_{Tx}(n_{Tx}) = 2\pi f_0 \frac{d_{Tx}(n_{Tx})\sin\theta}{c} \quad (7)$$
$(n_{Tx} = 1, \cdots, N_{Tx})$ $$\phi_{Rx}(n_{Rx}) = 2\pi f_0 \frac{d_{Rx}(n_{Rx})\sin\theta}{c} \quad (8)$$
$(n_{Rx} = 1, \cdots, N_{Rx})$ Upon receipt of the reception RF signal $Rx(n_{RX}, h, t)$ from the antenna 6, the receiver 31 of the reception unit 7 in the reception radar 5 down-converts the frequency of the reception RF signal $Rx(n_{RX}, h, t)$, using the local oscillation signal $L_0(h, t)$ that has been output from the local oscillator $21$-$n_{TX}$ of the transmission unit $2$-$n_{TX}$, and is expressed by expression (1) (step ST12 in FIG. 11).

After causing the reception RF signal $Rx(n_{RX}, h, t)$ whose frequency has been down-converted to pass through a band-pass filter, the receiver 31 also performs an amplification process on the reception RF signal $Rx(n_{RX}, h, t)$ and a phase detection process on the reception RF signal $Rx(n_{RX}, h, t)$, to generate a reception beat signal $V'(n_{RX}, h, t)$ as expressed in expression (9) shown below.

In expressions (9) and (10), $V'_0(n_{TX}, n_{RX}, h, t)$ represents the reception beat signal related to a transmission RF signal $Tx(n_{TX}, h, t)$ emitted from one transmission radar $1$-$n_{TX}$, and $A_v$ represents the amplitude of the reception beat signal $V'_0(n_{TX}, n_{RX}, h, t)$.

When the receiver 31 generates the reception beat signal $V'(n_{RX}, h, t)$, the A/D converter 32 of the reception unit 7 in the reception radar 5 converts the reception beat signal $V'(n_{RX}, h, t)$ from an analog signal into a digital signal, to generate a reception beat signal $V(n_{RX}, h, m)$ expressed by expression (11) shown below (step ST13 in FIG. 11).

After generating the reception beat signal $V(n_{RX}, h, m)$, the A/D converter 32 outputs the reception beat signal $V(n_{RX}, h, m)$ to the signal processor 9.

$$V(n_{Rx}, h, m) = \sum_{n_{Tx}=1}^{N_{Tx}} V_0(n_{Tx}, n_{Rx}, h, m) \quad (11)$$
$(m = 0, 1, \cdots, M - 1)$
$(h = 0, 1, \cdots, H - 1)$
$(n_{Rx} = 1, \cdots, N_{Rx})$ $$V_0(n_{Tx}, n_{Rx}, h, m) \cong \quad (12)$$
$$\begin{cases} A\exp\left(-j2\pi f_0 \frac{2(R_0 - v(hT_{pri} + m\Delta t))}{c}\right)\exp\left(j2\pi \frac{2B_0}{cT_0}R_0 m\Delta t\right) \\ \text{Code}(n_{Tx}, h)\exp(j\phi_{Tx}(n_{Tx}))\exp(j\phi_{Rx}(n_{Rx})), \\ \quad hT_{pri} \leq t < hT_{pri} + T_0 \\ 0, \text{ otherwise} \end{cases}$$

$(m = 0, 1, \cdots, M - 1)$
$(h = 0, 1, \cdots, H - 1)$
$(n_{Tx} = 1, \cdots, N_{Tx})$
$(n_{Rx} = 1, \cdots, N_{Rx})$ In expressions (11) and (12), $V_0(n_{TX}, n_{RX}, h, m)$ represents the reception beat signal related to a transmission RF signal $Tx(n_{TX}, h, t)$ emitted from one transmission radar $1$-$n_{TX}$, m represents the sampling number in PRI, and M represents the number of samplings.

$$V'(n_{Rx}, h, t) = \sum_{n_{Tx}=1}^{N_{Tx}} V'_0(n_{Tx}, n_{Rx}, h, t) = Rx(n_{Rx}, h, t)L_0^*(t) \quad (9)$$
$(h = 0, 1, \cdots, H - 1)$
$(n_{Rx} = 1, \cdots, N_{Rx})$ $$V'_0(n_{Tx}, n_{Rx}, h, t) = Rx(n_{Tx}, n_{Rx}, h, t)L_0^*(t) = \begin{cases} A_V \exp\left(j2\pi\left[-f_0\frac{2(R_c - vt)}{c} - \frac{B_0}{2T_0}\left(-\frac{4(R_0 - vt)}{c}t' + \frac{4(R_0 - vt)^2}{c^2}\right)\right]\right) \\ \text{Code}(n_{Tx}, h)\exp(j\phi_{Tx}(n_{Tx}))\exp(j\phi_{Rx}(n_{Rx})), hT_{pri} \leq t < hT_{pri} + T_0 \\ 0, \text{ otherwise} \end{cases} \quad (10)$$

$(h = 0, 1, \cdots, H - 1)$
$(n_{Tx} = 1, \cdots, N_{Tx})$
$(n_{Rx} = 1, \cdots, N_{Rx})$ Note that, in expression (12), the term including $1/c^2$ in expression (10) is approximated, for example.

Next, the contents of a process to be performed by the signal processor 9 are described with reference to FIG. 13.

FIG. 13 is a flowchart showing the contents of a process to be performed by the signal processor 9.

The signal processor 9 receives a reception beat signal $V(n_{RX}, h, m)$ output from the A/D converter 32 of the reception radar 5.

The reception beat signal $V(n_{RX}, h, m)$ contains transmission RF signals $Tx(n_{TX}, h, t)$ modulated with the modulation codes $Code(n_{TX}, h)$ for the respective transmission radars $1$-$n_{TX}$, which are expressed by expression (3).

Therefore, the signal processor 9 separates the reception beat signal $V(n_{RX}, h, m)$ for the respective transmission radars $1$-$n_{TX}$, and coherently integrates the separated reception beat signals. Thus, target detection performance can be enhanced.

The frequency domain converting unit 41 of the signal processor 9 generates a frequency domain signal $f_b(n_{RX}, h, k)$ by performing Discrete Fourier Transform on the reception beat signal $V(n_{RX}, h, m)$ output from the A/D converter 32 of the reception radar 5, as expressed in expression (13) shown below (step ST21 in FIG. 13).

That is, the frequency domain converting unit 41 converts the reception beat signal $V(n_{RX}, h, m)$ into the frequency domain signal $f_b(n_{RX}, h, k)$, and outputs the frequency domain signal $f_b(n_{RX}, h, k)$ to the code demodulating unit 42.

$$f_b(n_{Rx}, h, k) = \sum_{m=0}^{M-1} V(n_{Rx}, h, m)\exp\left(-j2\pi \frac{m}{M_{fft}}k\right) = \quad (13)$$

$$\sum_{n_{Tx}=0}^{N_{Tx}-1}\left[\sum_{m=0}^{M-1} V_0(n_{Tx}, n_{Rx}, h, m)\exp\left(-j2\pi \frac{m}{M_{fft}}k\right)\right]$$

$(k = 0, 1, \cdots, M_{fft} - 1)$ $(h = 0, 1, \cdots, H - 1)$ $(n_{Rx} = 1, \cdots, N_{Rx})$ In expression (13), $M_{fft}$ represents the number of Fourier transform points.

In this example, the frequency domain converting unit 41 performs Discrete Fourier Transform on the reception beat signal $V(n_{RX}, h, m)$. However, Discrete Fourier Transform is not necessarily performed, as long as the reception beat signal $V(n_{RX}, h, m)$, which is a time domain signal, can be converted into a frequency domain signal. For example, the reception beat signal $V(n_{RX}, h, m)$ may be subjected to Fast Fourier Transform.

The frequency domain signal $f_{b,0}(n_{TX}, n_{RX}, h, k)$ related to a transmission RF signal $Tx(n_{TX}, h, t)$ emitted from one transmission radar $1$-$n_{TX}$ is expressed by expression (14) shown below.

$$f_{b,0}(n_{Tx}, n_{Rx}, h, k) = \sum_{m=0}^{M-1} V_0(n_{Tx}, n_{Rx}, h, m)\exp\left(-j2\pi \frac{m}{M_{fft}}k\right) = \quad (14)$$

$$A\exp\left(-j2\pi f_0 \frac{2R_0}{c}\right)\exp\left(j2\pi f_0 \frac{2vhT_{pri}}{c}\right)$$

$$Code(n_{Tx}, h)\exp(j\phi_{Tx}(n_{Tx}))\exp(j\phi_{Rx}(n_{Rx}))\sum_{m=0}^{M-1}\left(\exp\left(j2\pi f_0 \frac{2vm\Delta t}{c}\right)\right.$$

$$\left.\exp\left(j2\pi \frac{2B_0}{cT_0}R_0 m\Delta t\right)\exp\left(-j2\pi \frac{m}{M_{fft}}k\right)\right) =$$

$$A\exp\left(-j2\pi f_0 \frac{2R_0}{c}\right)\exp\left(j2\pi f_0 \frac{2v(n_{Tx}T_{Tx} + hT_{pri})}{c}\right)$$

$$Code(n_{Tx}, h)\exp(j\phi_{Tx}(n_{Tx}))\exp(j\phi_{Rx}(n_{Rx}))$$

$$\sum_{m=0}^{M-1}\left(\exp\left(j2\pi\left(f_0 \frac{2v\Delta t}{c} + \frac{2B_0}{cT_0}R_0\Delta t - \frac{k}{M_{fft}}\right)m\right)\right)$$

$(k = 0, 1, \cdots, M_{fft} - 1)$ $(h = 0, 1, \cdots, H - 1)$ $(n_{Tx} = 1, \cdots, N_{Tx})$ $(n_{Rx} = 1, \cdots, N_{Rx})$ The frequency domain converting unit 41 of the signal processor 9 may perform a window function process as shown in expression (15) below to generate a reception beat signal $V'(n_{RX}, h, m)$ subjected to the window function process, before performing Discrete Fourier Transform on the reception beat signal $V(n_{RX}, h, m)$ output from the A/D converter 32 of the reception radar 5.

$$V'(n_{Rx}, h, m) = V(n_{Rx}, h, m)w_{heat}(h) \quad (15)$$

$(m = 0, 1, \cdots, M - 1)$ $(n = 0, 1, \cdots, N - 1)$ $$w_{heat}(m) = 0.54 + 0.46\cos\left(\frac{2\pi m}{M - 1}\right) \quad (16)$$

$(m = 0, 1, \cdots, M - 1)$

Here, in performing the window function process, the frequency domain converting unit 41 uses a Hamming window $w_{ham}$ (m) expressed by expression (16). However, the window function process may be performed with the use of a window function other than a Hamming window.

As the frequency domain converting unit 41 performs the window function process, the side lobe in the velocity direction in the frequency domain signal $f_b(n_{RX}, h, k)$ is reduced, and thus, a situation in which the target is buried in the side lobe can be avoided.

In a case where the frequency domain converting unit 41 generates the reception beat signal $V'(n_{RX}, h, m)$ subjected to the window function process, the frequency domain converting unit 41 generates the frequency domain signal $f_b(n_{RX}, h, k)$ by performing Discrete Fourier Transform on the reception beat signal $V'(n_{RX}, h, m)$ subjected to the window function process, instead of on the reception beat signal $V(n_{RX}, h, m)$ output from the A/D converter 32 of the reception radar 5.

The code demodulating unit 42 of the signal processor 9 acquires the modulation codes $Code(n_{TX}, h)$ generated by the modulation code generators 22-$n_{TX}$ of the $N_{TX}$ transmission radars $1$-$n_{TX}$.

Using the acquired $N_{TX}$ modulation codes $Code(n_{TX}, h)$, the code demodulating unit 42 performs code demodulation on the frequency domain signal $f_b(n_{RX}, h, k)$ output from the frequency domain converting unit 41 as shown in expression (17) shown below, and outputs the signals $f_{b,0,c}(n_{TX}, n_{RX}, h, k)$ subjected to the code demodulation, to the first integration unit 44 of the integration unit 43 (step ST22 in FIG. 13).

$$f_{b,0,c}(n_{Tx}, n_{Rx}, h, k) = \quad (17)$$

$$f_b(n_{Rx}, h, k)(-\text{Code}(n_{Tx}, h)) = A\exp\left(-j2\pi f_0 \frac{2R_0}{c}\right)$$

$$\exp\left(j2\pi f_0 \frac{2vhT_{pri}}{c}\right)\exp(j\phi_{Tx}(n_{Tx}))\exp(j\phi_{Rx}(n_{Rx}))$$

$$\sum_{m=0}^{M-1}\left(\exp\left(j2\pi\left(f_0 \frac{2v\Delta t}{c} + \frac{2B_0}{cT_0}R_0\Delta t - \frac{k}{M_{ff t}}\right)m\right)\right)$$

$$\left[1 - \sum_{n_{Tx} \neq n'_{Tx}} \text{Code}(n_{Tx}, h)\text{Code}(n'_{Tx}, h)\right]$$

$$(k = 0, 1, \cdots, M_{ff t} - 1)$$
$$(h = 0, 1, \cdots, H - 1)$$
$$(n_{Tx} = 1, \cdots, N_{Tx})$$
$$(n_{Rx} = 1, \cdots, N_{Rx})$$

The code demodulation process to be performed by the code demodulating unit 42 is now described in detail.

FIG. 14 are explanatory diagrams showing the code demodulation process to be performed by the code demodulating unit 42.

FIG. 14A shows a code demodulation process to be performed by the code demodulating unit 42 for the frequency domain signal $f_b(1, h, k)$. FIG. 14B shows a code demodulation process to be performed by the code demodulating unit 42 for the frequency domain signal $f_b(2, h, k)$. FIG. 14C shows a code demodulation process to be performed by the code demodulating unit 42 for the frequency domain signal $f_b(3, h, k)$.

For example, in a case where code demodulation is performed on the frequency domain signal $f_b(1, h, k)$ corresponding to the transmission RF signal Tx(1, h, t) for $n_{TX}=1$ included in the frequency domain signals $f_b(n_{RX}, h, k)$ output from the frequency domain converting unit 41, the code demodulating unit 42 acquires the modulation code Code(1, h) generated by the transmission radar 1-1.

When the target to be observed is a stationary target, the code for the frequency domain signal $f_b(1, h, k)$ corresponding to the transmission RF signal Tx(1, h, t) for $n_{TX}=1$ is "1 1 -1", which is the same as the code "1 1 -1" for the modulation code Code(1, h). In FIG. 14A, the code for the frequency domain signal $f_b(1, h, k)$ corresponding to the transmission RF signal Tx(1, h, t) for $n_{TX}=1$ is shown as a demodulation code.

As shown in FIG. 14A, the code demodulating unit 42 multiplies the code "1 1 -1" for the frequency domain signal $f_b(1, h, k)$ as a demodulation code by the acquired modulation code Code(1, h)="1 1 -1", to code-demodulate the frequency domain signal $f_b(1, h, k)$.

As shown in FIG. 14A, the code "1 -1 1" for the frequency domain signal $f_b(1, h, k)$, which is a demodulation code, and the modulation code Code(1, h)="1 -1 1" are in phase with each other between hits. Accordingly, the code after the demodulation is "1 1 1", and it is possible to perform coherent integration.

In the example illustrated in FIG. 14A, if the code after demodulation is integrated between hits, or if the code "1", the code "1", and the code "1" are integrated, the amplitude after the integration is "3", and the autocorrelation between the frequency domain signal $f_b(1, h, k)$ as a demodulation code and the modulation code Code(1, h) is high.

At this stage, the code for the frequency domain signal $f_b(2, h, k)$ corresponding to the transmission RF signal Tx(2, h, t) for $n_{TX}=2$ is "1 -1 1", which differs from the code "1 1 -1" for the modulation code Code(1, h). Therefore, the code for the frequency domain signal $f_b(2, h, k)$, which is a demodulation code, and the code for the modulation code Code(1, h) are not in phase between all the hits.

Because of this, as shown in FIG. 14B, the code demodulating unit 42 multiplies the code "1 -1 1" for the frequency domain signal $f_b(2, h, k)$ as a demodulation code by the modulation code Code(1, h)="1 1 -1", to perform code demodulation on the frequency domain signal $f_b(2, h, k)$. As a result, the code after the demodulation is "1 -1 -1".

In the example illustrated in FIG. 14B, if the code after demodulation is integrated between hits, or if the code "-1", the code "-1", and the code "1" are integrated, the amplitude after the integration is "-1", and the cross-correlation between the frequency domain signal $f_b(2, h, k)$ as a demodulation code and the modulation code Code(1, h) is low.

Further, the code for the frequency domain signal $f_b(3, h, k)$ corresponding to the transmission RF signal Tx(3, h, t) for $n_{TX}=3$ is "-1 1 1", which differs from the code "1 1 -1" for the modulation code Code(1, h). Therefore, the code for the frequency domain signal $f_b(3, h, k)$, which is a demodulation code, and the code for the modulation code Code(1, h) are not in phase between all the hits.

Because of this, as shown in FIG. 14C, the code demodulating unit 42 multiplies the code "1 -1 1" for the frequency domain signal $f_b(3, h, k)$ as a demodulation code by the modulation code Code(1, h)="1 1 -1", to perform code demodulation on the frequency domain signal $f_b(3, h, k)$. As a result, the code after the demodulation is "-1 1 -1".

In the example illustrated in FIG. 14C, if the code after demodulation is integrated between hits, or if the code "-1", the code "1", and the code "-1" are integrated, the amplitude after the integration is "-1", and the cross-correlation between the frequency domain signal $f_b(3, h, k)$ as a demodulation code and the modulation code Code(1, h) is low.

As described above, the modulation code Code(1, h) generated by the transmission radar 1-1 and the frequency domain signal $f_b(1, h, m)$ corresponding to the transmission RF signal Tx(1, h, t) for $n_{TX}=1$ has high autocorrelation.

On the other hand, the modulation code Code(1, h) generated by the transmission radar 1-1 and the frequency domain signal $f_b(2, h, m)$ corresponding to the transmission RF signal Tx(2, h, t) for $n_{TX}=2$ has low cross-correlation.

The modulation code Code(1, h) generated by the transmission radar 1-1 and the frequency domain signal $f_b(3, h, m)$ corresponding to the transmission RF signal Tx(3, h, t) for $n_{TX}=3$ also has low cross-correlation.

As is apparent from the above, when the modulation code Code(1, h) generated by the transmission radar 1-1 is used, the frequency domain signal $f_b(1, h, k)$ corresponding to the transmission RF signal Tx(1, h, t) for $n_{TX}=1$, which is included in the frequency domain signals $f_b(n_{RX}, h, k)$, can be separated with high precision and be subjected to code demodulation.

In this example, code demodulation is performed on the frequency domain signal $f_b(1, h, k)$ corresponding to the transmission RF signal Tx(1, h, t) for $n_{TX}=1$. However, when code demodulation is performed on the frequency domain signal $f_b(2, h, k)$ corresponding to the transmission RF signal Tx(2, h, t) for $n_{TX}=2$, the code demodulation can be performed in the same manner as above, using the modulation code Code(2, h) generated by the transmission radar 1-2.

Further, when code demodulation is performed on the frequency domain signal $f_b(3, h, k)$ corresponding to the transmission RF signal Tx(3, h, t) for $n_{TX}=3$, the code demodulation can be performed in the same manner as above, using the modulation code Code(3, h) generated by the transmission radar 1-3.

The signals $f_{b,0,c}(n_{TX}, n_{RX}, h, k)$ after the code demodulation performed by the code demodulating unit 42 are output to the first integration unit 44 of the integration unit 43.

When the target to be observed is assumed to be a stationary target, the first integration unit 44 of the integration unit 43 performs hit-direction complex integration on the signals $f_{b,0,c}(n_{TX}, n_{RX}, h, k)$ after code-demodulation, output from the code demodulating unit 42 as shown in expression (18) shown below, to coherently integrate the signals $f_{b,0,c}(n_{TX}, n_{RX}, h, k)$ (step ST23 in FIG. 13).

The first integration unit 44 then outputs the signals $f_d(n_{TX}, n_{RX}, k)$ subjected to the integration, to the second integration unit 45.

$$f_d(n_{Tx}, n_{Rx}, k) = \sum_{h=0}^{H-1} f_{b,0,c}(n_{Tx}, n_{Rx}, h, k) \quad (18)$$

Figure 15:
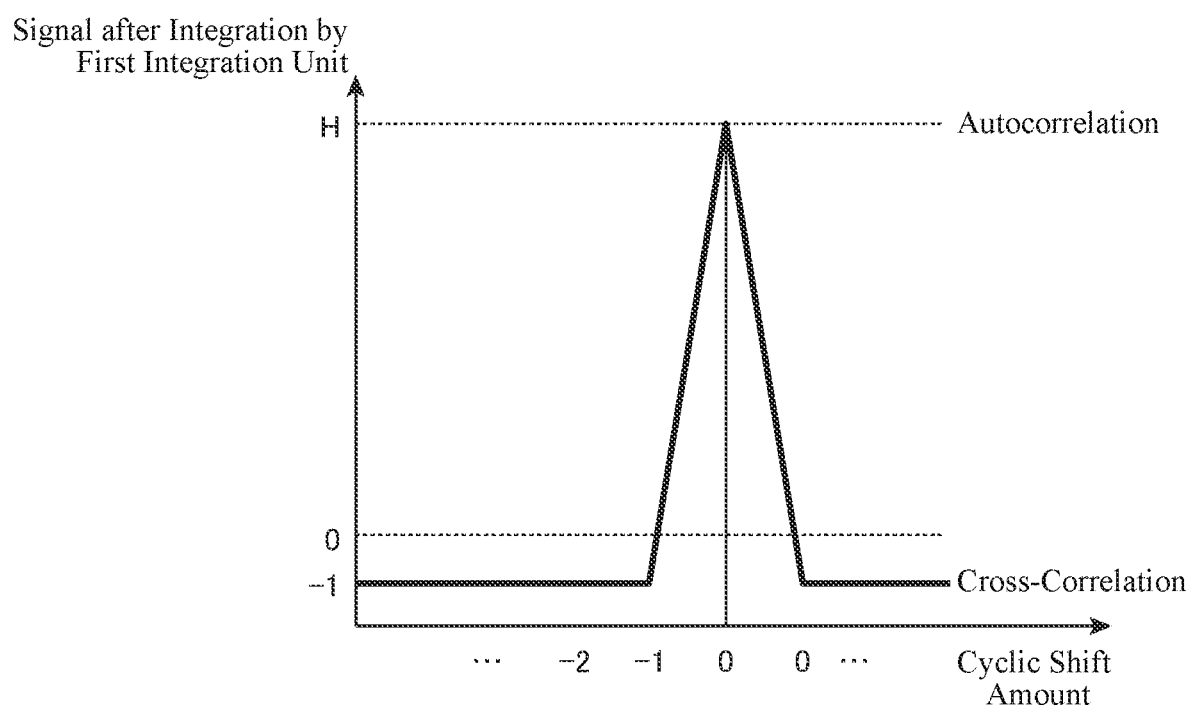
FIG. 15 is an explanatory diagram showing the relationship between the cyclic shift amount $\Delta\tau(n_{TX})$ with respect to the cyclic code $C_0(h)$ and a signal $f_d(n_{TX}, n_{RX}, k)$ ($n_{TX}=1$, $n_{RX}=1$) after the integration performed by a first integration unit 44.

$(k = 0, 1, \cdots, M_{fft} - 1)$ $(h = 0, 1, \cdots, H - 1)$ $(n_{Tx} = 1, \cdots, N_{Tx})$ $(n_{Rx} = 1, \cdots, N_{Rx})$ FIG. 15 is an explanatory diagram showing the relationship between the cyclic shift amount $\Delta\tau(n_{TX})$ with respect to the cyclic code $C_0(h)$ and the signal $f_d(n_{TX}, n_{RX}, k)$ ($n_{TX}=1$, $n_{RX}=1$) after the integration performed by the first integration unit 44. However, the bin at which the amplitude of the signal $f_d(n_{TX}, n_{RX}, k)$ after the integration indicates the maximum value is the K-th bin.

In FIG. 15, when the cyclic shift amount is 0, the signal $f_d(1, 1, k)$ after the integration performed by the first integration unit 44 is larger than 0, which means that the autocorrelation is high.

Further, in FIG. 15, when the cyclic shift amount is 1, −1, and −2, the signal $f_d(1, 1, k)$ after the integration performed by the first integration unit 44 is −1, which means that the cross-correlation is low.

Accordingly, when the modulation code Code(1, h) for the cyclic shift amount $\Delta\tau(1)=0$ is used, the frequency domain signal $f_b(1, h, k)$ corresponding to the transmission RF signal Tx(1, h, t) for $n_{TX}=1$ among the frequency domain signals $f_b(n_{RX}, h, k)$ can be separated with high precision and be subjected to code demodulation. Thus, the codes after the demodulation can be coherently integrated.

Further, when the modulation code Code(2, h) for the cyclic shift amount $\Delta\tau(2)=-1$ is used, the frequency domain signal $f_b(2, h, k)$ corresponding to the transmission RF signal Tx(2, h, t) for $n_{TX}=2$ can be separated with high precision and be subjected to code demodulation. Thus, the codes after the demodulation can be coherently integrated.

When the modulation code Code(3, h) for the cyclic shift amount $\Delta\tau(3)=-2$ is used, the frequency domain signal $f_b(3, h, k)$ corresponding to the transmission RF signal Tx(3, h, t) for $n_{TX}=3$ can be separated with high precision and be subjected to code demodulation. Thus, the codes after the demodulation can be coherently integrated.

When the target to be observed is assumed to be a moving target, the first integration unit 44 performs hit-direction Discrete Fourier Transform on the signals $f_{b,0,c}(n_{TX}, n_{RX}, h, k)$ after code-demodulation, output from the code demodulating unit 42 as shown in expression (19) shown below, to coherently integrate the signals $f_{b,0,c}(n_{TX}, n_{RX}, h, k)$ (step ST23 in FIG. 13).

The first integration unit 44 then outputs the signals $f_d(n_{TX}, n_{RX}, l, k)$ subjected to the integration, to the second integration unit 45.

$$f_d(n_{Tx}, n_{Rx}, l, k) = \sum_{h=0}^{H-1} f_{b,0,c}(n_{Tx}, n_{Rx}, h, k)\exp\left(-j2\pi\frac{h}{H_{fft}}l\right) = \quad (19)$$

$$A\exp\left(-j2\pi f_0 \frac{2R_0}{c}\right)\exp(j\phi_{Tx}(n_{Tx}))\exp(j\phi_{Rx}(n_{Rx}))$$

$$\sum_{m=0}^{M-1}\left(\exp\left(j2\pi\left(f_0\frac{2v\Delta t}{c} - \frac{2B_0}{cT_0}R_0\Delta t - \frac{k}{M_{fft}}\right)m\right)\right)$$

$$\sum_{h=0}^{H-1}\left(\exp\left(j2\pi\left(f_0\frac{2vT_{pri}}{c} - \frac{l}{H_{fft}}\right)h\right)\right)$$

$$\left[1 - \sum_{n_{Tx} \neq n'_{Tx}} \text{Code}(n_{Tx}, h)\text{Code}(n'_{Tx}, h)\right]$$

Figure 16:
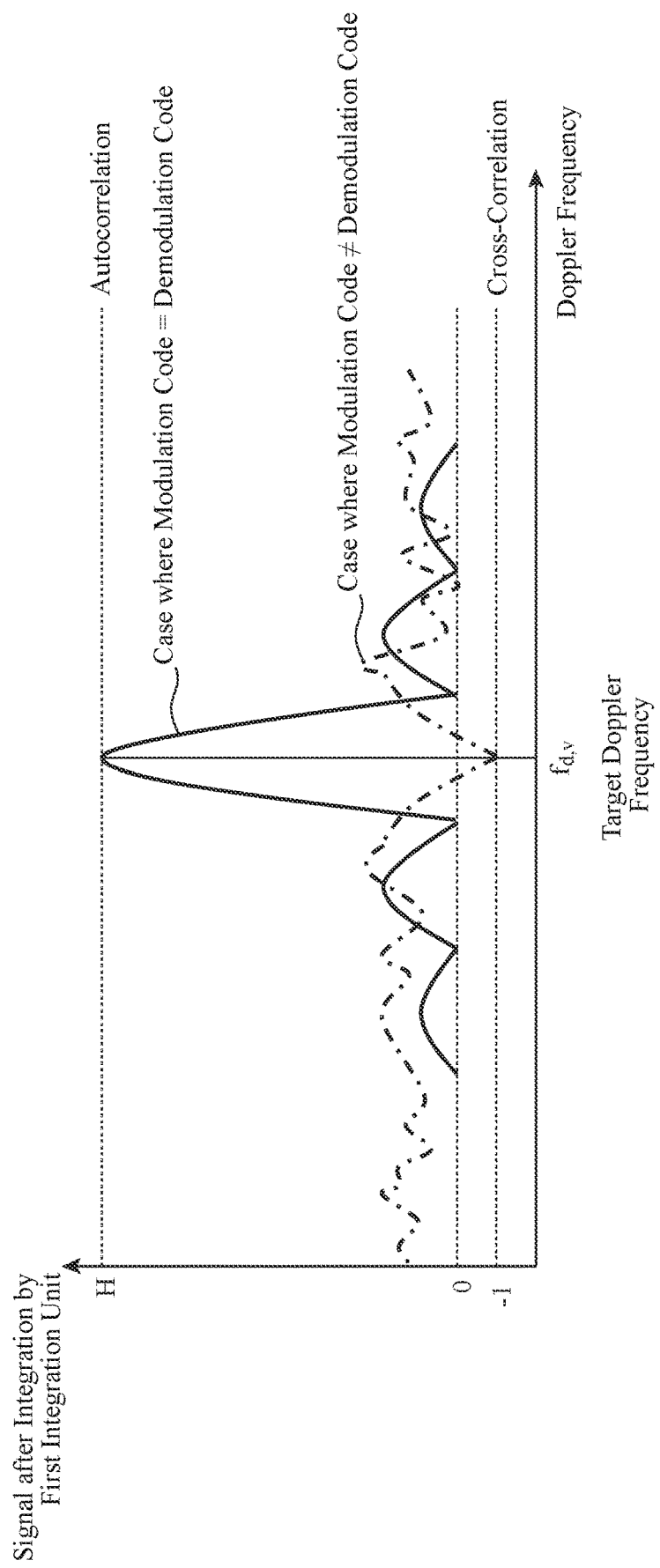
FIG. 16 is an explanatory diagram showing the relationship between the modulation codes $\text{Code}(n_{TX}, h)$ and signals $f_d(n_{TX}, n_{RX}, k)$ after the integration performed by the first integration unit 44.

$(k = 0, 1, \cdots, M_{fft} - 1)$ $(l = 0, 1, \cdots, H_{fft} - 1)$ $(n_{Tx} = 1, \cdots, N_{Tx})$ $(n_{Rx} = 1, \cdots, N_{Rx})$ FIG. 16 is an explanatory diagram showing the relationship between the modulation codes Code($n_{TX}$, h) and the signals $f_d(n_{TX}, n_{RX}, k)$ after the integration performed by the first integration unit 44.

In FIG. 16, when the modulation codes Code($n_{TX}$, h) and the frequency domain signals $f_b(n_{TX}, h, k)$ as demodulation codes match after the signals $f_{b,0,c}(n_{TX}, n_{RX}, h, k)$ subjected to code demodulation are subjected to Discrete Fourier Transformed in the hit direction, the value of integral of the Doppler frequency of the target, or the signal $f_d(n_{TX}, n_{RX}, k)$ after the integration performed by the first integration unit 44, is maximized.

On the other hand, when the modulation codes Code($n_{TX}$, h) and the frequency domain signals $f_b(n_{RX}, h, k)$ as demodulation codes do not match, the value of integral of the Doppler frequency of the target, or the signal $f_d(n_{TX}, n_{RX}, k)$ after the integration performed by the first integration unit 44, is −1, and the cross-correlation is low.

When the target to be observed is assumed to be a stationary target, the second integration unit 45 integrates the integrated signal $f_d(n_{TX}, n_{RX}, k)$ output from the first integration unit 44, on the basis of the positions of the transmission radars 1-$n_{TX}$, the position of the reception radar 5, and the target angle number $n_\theta$ indicating an assumed target angle, as shown in expression (20) below (step ST24 in FIG. 13).

The second integration unit 45 then outputs the signal $R_\Sigma(n_\theta, k)$ after the integration to the target detecting unit 10.

$$R_\Sigma(n_\theta, k) = \sum_{n_{Tx}=0}^{N_{Tx}-1} \sum_{n_{Rx}=0}^{N_{Rx}-1} \{f_d(n_{Tx}, n_{Rx}, k) \quad (20)$$

$$\exp(-j\phi'_{Tx}(n_{Tx}, n_\theta))\exp(-j\phi'_{Rx}(n_{Rx}, n_\theta))\}$$

$$(k = 0, 1, \cdots, M_{\textit{fft}} - 1)$$

$$(n_\theta = 0, 1, \cdots, N_\theta - 1)$$

In expression (20), $N_\theta$ represents the assumed target angle.

$\phi'_{Tx}(n_{TX}, n_\theta)$ represents the arrival phase difference between the transmission radar $1$-$n_{TX}$ and the target, and is expressed by expression (20a) shown below.

$\phi'_{Rx}(n_{RX}, n_\theta)$ represents the arrival phase difference between the reception radar 5 and the target, and is expressed by expression (20b) shown below.

In the example illustrated in FIG. 1, the number of reception radars 5 is one. However, even if the number of reception radars 5 is two or more, the integrated signal $f_d(n_{TX}, n_{RX}, k)$ output from the first integration unit 44 can be integrated in accordance with expression (20).

$$\phi'_{Tx}(n_{Tx}, n_\theta) = 2\pi f_0 \frac{d_{Tx}(n_{Tx})\sin\theta'(n_\theta)}{c} \quad (20a)$$

$$(n_{Tx} = 0, 1, \cdots, N_{Tx} - 1)$$

$$(n_\theta = 0, 1, \cdots, N_\theta - 1)$$

$$\phi'_{Rx}(n_{Rx}, n_\theta) = 2\pi f_0 \frac{d_{Rx}(n_{Rx})\sin\theta'(n_\theta)}{c} \quad (20b)$$

$$(n_{Rx} = 0, 1, \cdots, N_{Rx} - 1)$$

$$(n_\theta = 0, 1, \cdots, N_\theta - 1)$$

In expressions (20a) and (20b), $\theta'(n_\theta)$ represents an assumed target angle, and is expressed by expression (20c) shown below.

$$\theta'(n_\theta) = n_\theta \Delta\theta_{samp} \quad (20c)$$

In expression (20c), $\Delta\theta_{samp}$ represents an assumed target angle interval.

When the actual target angle $\theta$ and the assumed target angle indicated by the target angle number $n_\theta$ are substantially the same, the integrated signal $f_d(n_{TX}, n_{RX}, k)$ output from the first integration unit 44 is coherently integrated, and the electric power of the signal $R_\Sigma(n_\theta, k)$ after the integration performed by the second integration unit 45 is substantially maximized.

Accordingly, as the signal of each transmission radar $1$-$n_{TX}$ is integrated, the electric power increases, and thus, it becomes possible to obtain a radar apparatus with enhanced detection performance. Further, as the signal of each transmission radar $1$-$n_{TX}$ is integrated, the antenna aperture length virtually increases, and thus, an effect to increase angular resolution can be achieved.

When the target to be observed is assumed to be a moving target, the second integration unit 45 integrates the integrated signal $f_d(n_{TX}, n_{RX}, 1, k)$ output from the first integration unit 44, on the basis of the positions of the transmission radars $1$-$n_{TX}$, the position of the reception radar 5, and the target angle number $n_\theta$ indicating an assumed target angle, as shown in expression (21) below (step ST24 in FIG. 13).

The second integration unit 45 then outputs the signal $R_\Sigma(n_\theta, 1, k)$ after the integration to the target detecting unit 10.

$$R_\Sigma(n_\theta, l, k) = \sum_{n_{Tx}=0}^{N_{Tx}-1} \sum_{n_{Rx}=0}^{N_{Rx}-1} \{f_d(n_{Tx}, n_{Rx}, l, k) \quad (21)$$

$$\exp(-j\phi'_{Tx}(n_{Tx}, n_\theta))\exp(-j\phi'_{Rx}(n_{Rx}, n_\theta))\}$$

$$(l = 0, 1, \cdots, H_{\textit{fft}} - 1)$$

$$(k = 0, 1, \cdots, M_{\textit{fft}} - 1)$$

$$(n_\theta = 0, 1, \cdots, N_\theta - 1)$$

When the target to be observed is assumed to be a stationary target, the target detecting unit 10 performs a target detection process on the basis of the integrated signal $R_\Sigma(n_\theta, k)$ output from the second integration unit 45 of the signal processor 9, to identify the arrival angle number $n_\theta'$ of the target, the velocity bin number $l'_{tgt}$ of the target, and the sampling number $k'_{tgt}$ in the distance direction of the target.

When the target to be observed is assumed to be a moving target, the target detecting unit 10 performs a target detection process on the basis of the integrated signal $R_\Sigma(n_\theta, 1, k)$ output from the second integration unit 45 of the signal processor 9, to identify the arrival angle number $n_\theta'$ of the target, the velocity bin number $l'_{tgt}$ of the target, and the sampling number $k'_{tgt}$ in the distance direction of the target.

It is possible to adopt a cell average constant false alarm rate (CA-CFAR) process as the target detection process, for example.

After detecting the target, the target detecting unit 10 outputs the integrated signal $R_\Sigma(n_\theta, k)$ or $R_\Sigma(n_\theta, 1, k)$ output from the second integration unit 45, the identified arrival angle number $n_\theta'$ of the target, the identified velocity bin number $l'_{tgt}$ of the target, and the identified sampling number $k'_{tgt}$ in the distance direction of the target, to the target information calculating unit 11.

The target information calculating unit 11 calculates the target angle $\theta'_{tgt}$, on the basis of the arrival angle number $n_\theta'$ of the target output from the target detecting unit 10, as shown in expression (22) below.

The target information calculating unit 11 also calculates the velocity $v'_{tgt}$ relative to the target, on the basis of the velocity bin number $l'_{tgt}$ of the target output from the target detecting unit 10, as shown in expression (23) below.

The target information calculating unit 11 further calculates a distance $R'_{tgt}$ relative to the target, on the basis of the distance-direction sampling number $k'_{tgt}$ output from the target detecting unit 10, as shown in expression (24) below.

$$\theta'_{tgt} = \theta'(n'_\theta) \quad (22)$$

$$v'_{tgt} = -\frac{v_{amb}}{2} + l'_{tgt}\Delta v_{samp} \quad (23)$$

$$R'_{tgt} = k'_{tgt}\Delta r_{samp} \quad (24)$$

In expressions (23) and (24), $v_{amb}$ represents a velocity at which the radar apparatus can measure the target with no ambiguity, and is set beforehand in the target information calculating unit 11.

Further, $\Delta v_{samp}$ represents the sampling interval in the velocity direction, and $\Delta r_{samp}$ represents the sampling interval in the distance direction.

The display device 12 displays the target angle $\theta'_{tgt}$, the target relative velocity $v'_{tgt}$, and the target relative distance $R'_{tgt}$, which have been calculated by the target information calculating unit 11, on the display.

As is apparent from the above, according to the first embodiment, the transmission radars 1-1 through 1-$N_{TX}$ generate mutually different modulation codes Code ($n_{TX}$,h) by cyclically shifting the same code sequence by mutually different cyclic shift amounts $\Delta\tau(n_{TX})$ ($n_{TX}$=1, 2, ..., $N_{TX}$), and generate mutually different transmission RF signals 4-$n_{TX}$ using the mutually different modulation codes Code ($n_{TX}$, h). Thus, the number of transmission radars 1-$n_{TX}$ can be made larger, and target detection accuracy can be made higher than in a case where orthogonal codes are used as mutually different modulation codes.

Further, according to the first embodiment, when the target to be observed is assumed to be a stationary target, the first integration unit 44 performs hit-direction complex integration on the signals $f_{b,0,c}(n_{TX}, n_{TX}, h, k)$ subjected to code demodulation and output from the code demodulating unit 42, to coherently integrate the signals $f_{b,0,c}(n_{TX}, n_{RX}, h, k)$. Thus, cross-correlation can be lowered. As a result, target detection performance can be enhanced.

Further, according to the first embodiment, when the target to be observed is assumed to be a moving target, the first integration unit 44 performs hit-direction Discrete Fourier Transform on the signals $f_{b,0,c}(n_{TX}, n_{RX}, h, k)$ subjected to code demodulation and output from the code demodulating unit 42, to coherently integrate the signals $f_{b,0,c}(n_{TX}, n_{RX}, h, k)$. Thus, target detection performance can be enhanced, even though the target to be observed is a moving target.

According to the first embodiment, the second integration unit 45 integrates the integrated signal output from the first integration unit 44, on the basis of the positions of the transmission radars 1-$n_{TX}$, the position of the reception radar 5, and the target angle number $n_\theta$ indicating an assumed target angle. Thus, target detection performance and angle measurement performance can be enhanced.

Note that, within the scope of the present invention, any of the components of the embodiment may be modified, or any of the components of the embodiment may be omitted.

INDUSTRIAL APPLICABILITY

The present invention is suitable for a radar apparatus that detects a target.

REFERENCE SIGNS LIST 1-1 to 1-$N_{TX}$ Transmission radar
2-1 Transmission unit
3-1 Antenna
4-1 to 4-$N_{TX}$ Transmission RF signal (transmission signal)
5 Reception radar
6 Antenna
7 Reception unit
8 Data processing device
9 Signal processor
10 Target detecting unit
11 Target information calculating unit
12 Display device
21-$n_{TX}$ Local oscillator
22-$n_{TX}$ Modulation code generator
23-$n_{TX}$ Transmitter
31 Receiver
32 A/D converter
41 Frequency domain converting unit
42 Code demodulating unit
43 Integration unit
44 First integration unit
45 Second integration unit
51 Frequency domain converting circuit
52 Code demodulating circuit
53 First integration circuit
54 Second integration circuit
55 Target detecting circuit
56 Target information calculating circuit
61 Processor
62 Memory

The invention claimed is:

1. A radar apparatus comprising:
a plurality of transmission radars which generate mutually different modulation codes by cyclically shifting the same code sequence by mutually different cyclic shift amounts, generate mutually different transmission signals using the mutually different modulation codes, and emit the mutually different transmission signals;
a reception radar which receives reflected waves of the transmission signals reflected by a target to be observed after the transmission signals are emitted from the plurality of transmission radars, and outputting a reception signal of the reflected waves;
a signal processor which performs code demodulation on the reception signal output from the reception radar, using the modulation codes generated by the plurality of transmission radars; and
target detecting circuitry which detects the target on a basis of a signal subjected to the code demodulation performed by the signal processor,
wherein the signal processor includes:
a frequency domain converter which converts the reception signal output from the reception radar into a frequency domain signal;
a code demodulator which performs code demodulation on the frequency domain signal converted by the frequency domain converter, using the modulation codes generated by the plurality of transmission radars; and
an integrator which integrates the signal subjected to the code demodulation performed by the code demodulator, and outputs the integrated signal to the target detector,
wherein the integrator includes a first integrator which coherently integrates the signal subjected to the code demodulation performed by the code demodulator, by performing hit-direction complex integration on the signal subjected to the code demodulation.

2. The radar apparatus according to claim 1, wherein the integrator includes a second integrator which integrates the signal integrated by the first integrator, on a basis of positions of the plurality of transmission radars, a position of the reception radar, and an assumed value of an angle with the target.

3. The radar apparatus according to claim 1, wherein the plurality of transmission radars use an M-sequence as the code sequence.

4. The radar apparatus according to claim 1, wherein the plurality of transmission radars use, as the code sequence, a cyclic code having a cross-correlation value that varies with cyclic shift amounts, set mutually different cyclic shift amounts on a basis of a value of integral of the cross-correlation value with the cyclic code, and cyclically shift the code sequence by the set cyclic shift amounts.

5. A radar apparatus comprising:

a plurality of transmission radars which generate mutually different modulation codes by cyclically shifting the same code sequence by mutually different cyclic shift amounts, generate mutually different transmission signals using the mutually different modulation codes, and emit the mutually different transmission signals;

a reception radar which receives reflected waves of the transmission signals reflected by a target to be observed after the transmission signals are emitted from the plurality of transmission radars, and outputting a reception signal of the reflected waves;

a signal processor which performs code demodulation on the reception signal output from the reception radar, using the modulation codes generated by the plurality of transmission radars; and target detecting circuitry which detects the target on a basis of a signal subjected to the code demodulation performed by the signal processor, wherein the signal processor includes:

a frequency domain converter which converts the reception signal output from the reception radar into a frequency domain signal;

a code demodulator which performs code demodulation on the frequency domain signal converted by the frequency domain converter, using the modulation codes generated by the plurality of transmission radars; and an integrator which integrates the signal subjected to the code demodulation performed by the code demodulator, and outputs the integrated signal to the target detector, wherein the integrator includes a first integrator coherently integrates the signal subjected to the code demodulation performed by the code demodulator, by performing hit-direction Fourier Transform on the signal subjected to the code demodulation.

6. The radar apparatus according to claim 5, wherein the integrator includes a second integrator which integrates the signal integrated by the first integrator, on a basis of positions of the plurality of transmission radars, a position of the reception radar, and an assumed value of an angle with the target.

* * * * *